US011414336B2

(12) United States Patent
Berkey et al.

(10) Patent No.: US 11,414,336 B2
(45) Date of Patent: Aug. 16, 2022

(54) APPARATUSES AND METHODS FOR HEATING AND COOLING GLASS TUBING

(71) Applicant: CORNING INCORPORATED, Corning, NY (US)

(72) Inventors: Adam Charles Berkey, Pittsburgh, PA (US); Martin A de la Torre, El Paso, TX (US); Sowmya Krishnamurthy, Painted Post, NY (US); Jiandong Meng, Painted Post, NY (US); David Posada-Pineda, Ithaca, NY (US); Ryan Daniel Ratchford, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 196 days.

(21) Appl. No.: 16/690,626

(22) Filed: Nov. 21, 2019

(65) Prior Publication Data
US 2020/0172423 A1 Jun. 4, 2020

Related U.S. Application Data

(60) Provisional application No. 62/773,418, filed on Nov. 30, 2018.

(51) Int. Cl.
*C03B 9/36* (2006.01)
*C03B 9/38* (2006.01)
C03B 17/04 (2006.01)

(52) U.S. Cl.
CPC .......... *C03B 9/3672* (2013.01); *C03B 9/3841* (2013.01); *C03B 17/04* (2013.01)

(58) Field of Classification Search
CPC . C03B 37/0146; C03B 9/3672; C03B 9/3841; C03B 37/012; C03B 37/01274;
(Continued)

(56) References Cited

U.S. PATENT DOCUMENTS 1,539,598 A 5/1925 Rau
1,680,543 A * 8/1928 Howard .................. C03B 7/088
65/327
(Continued)

FOREIGN PATENT DOCUMENTS

DE 1208047 B * 12/1965 ........... C03B 17/025
DE 1208047 B1 12/1965
(Continued)

OTHER PUBLICATIONS

Eurotherm By Schneider Electric, "Tube Glass" online]; retrieved from the internet May 25, 2017, <URL http://www.eurotherm.com/industries/glass/tube-glass/> pp. 1-3.
(Continued)

*Primary Examiner* — Alison L Hindenlang
*Assistant Examiner* — Steven S Lee
(74) *Attorney, Agent, or Firm* — F. Brock Riggs

(57) ABSTRACT

A muffle for a glass tube forming process includes an inlet end coupled to a bowl, an outlet end having an inner dimension larger than an inner dimension of the inlet end, and a sidewall extending from inlet end to the outlet end. A radial distance from a center axis of the muffle to an inner surface of the sidewall increases from the inlet end to the outlet end and the sidewall is substantially free of abrupt changes in the radial distance that produce instability regions within the muffle. The muffle includes a channel between an outer surface of a portion of the sidewall and an insulating layer disposed about the sidewall, the channel being operable to pass a heat transfer fluid into thermal communication with the sidewall to provide cooling to the muffle. Glass forming systems including the muffle and glass tube forming processes are also disclosed.

25 Claims, 17 Drawing Sheets

(58) Field of Classification Search
CPC ..... C03B 17/04; C03B 17/025; C03N 9/3672; C03N 9/2841
See application file for complete search history.

(56) References Cited

U.S. PATENT DOCUMENTS

| | | | | |
|---|---|---|---|---|
| 2,009,793 | A * | 7/1935 | Sanchez-Vello | C03B 17/04 65/87 |
| 2,429,220 | A * | 10/1947 | Danner | C03B 17/04 65/184 |
| 3,078,695 | A | 2/1963 | Kozak et al. | |
| 3,190,739 | A * | 6/1965 | Wilson | C03B 17/04 65/85 |
| 3,410,675 | A * | 11/1968 | Dockerty | C03B 17/04 65/129 |
| 4,247,320 | A * | 1/1981 | Bansal | C03B 17/04 65/327 |
| 4,305,747 | A | 12/1981 | Kirkman et al. | |
| 4,617,041 | A * | 10/1986 | Meerman | C03B 19/01 65/385 |
| 6,138,481 | A * | 10/2000 | Saito | C03B 23/043 117/215 |
| 2002/0184922 | A1* | 12/2002 | Dick | C03B 17/04 65/182.2 |
| 2012/0042692 | A1* | 2/2012 | Fredholm | C03B 17/04 65/129 |
| 2013/0305784 | A1* | 11/2013 | Gromann | C03B 17/04 65/29.14 |
| 2015/0197442 | A1* | 7/2015 | Bisson | C03B 17/04 65/184 |
| 2017/0203991 | A1* | 7/2017 | Berkey | G05D 23/19 |
| 2017/0341966 | A1* | 11/2017 | De Angelis | C03B 17/04 |
| 2019/0284081 | A1* | 9/2019 | Berkey | C03B 17/04 |

FOREIGN PATENT DOCUMENTS

| | | | | |
|---|---|---|---|---|
| EP | 2055261 A1 * | 5/2009 | | A61K 31/05 |
| EP | 2364956 A1 | 9/2011 | | |
| JP | 07247133 A * | 9/1995 | | C03B 37/0146 |
| JP | 10059729 A | 3/1998 | | |
| JP | 2000344534 A | 12/2000 | | |
| JP | 2004252094 A | 9/2004 | | |
| JP | 3637178 B2 | 4/2005 | | |
| SU | 821414 A1 * | 4/1981 | | C03B 17/04 |
| SU | 821414 A1 | 4/1981 | | |

OTHER PUBLICATIONS

International Search Report and Written Opinion dated Sep. 1, 2017, for PCT/US2017/034369 filed May 25, 2017, pp. 1-13.
International Search Report and Written Opinion of the European International Searching Authority; PCT/US2019/061912; dated Feb. 11, 2020; 11 pgs.

* cited by examiner

APPARATUSES AND METHODS FOR HEATING AND COOLING GLASS TUBING

CROSS-REFERENCE TO RELATED APPLICATION

This application claims the benefit of priority under 35 U.S.C § 120 of U.S. Provisional Application Ser. No. 62/773,418 filed on Nov. 30, 2018, the content of which is relied upon and incorporated herein by reference in its entirety.

BACKGROUND

Field

The present specification generally relates to apparatuses, systems, and methods for continuously producing glass tubing, in particular apparatuses, systems, and methods for heating and cooling of glass tubing.

Technical Background

Historically, glass has been used to produce a variety of articles. For example, because of its hermeticity, optical clarity, and excellent chemical durability relative to other materials, glass has been a preferred material for pharmaceutical applications, including, without limitation, vials, syringes, ampoules, cartridges, and other glass articles. Production of these articles from glass starts with providing glass tubing that may subsequently be formed and separated into a plurality of glass articles. Specifically, the glass used in pharmaceutical packaging must have adequate mechanical and chemical durability so as to not affect the stability of the pharmaceutical formulations contained therein. Glasses having suitable chemical durability include those glass compositions within the ASTM standard "Type IA" and 'Type IB' glass compositions which have a proven history of chemical durability.

Pharmaceutical containers, such as vials, syringes, ampoules, cartridges, and other glass containers and articles, can be made from lengths of glass tubing. Various processes, such as the Vello process and the Danner process for example, are available for drawing a continuous length of glass tubing from a source of molten glass. In the Vello process, molten glass flows vertically from a bowl through on annular space surrounding a hollow blow tube through which air may be blown. The glass tubing drawn from the bowl may be passed through a muffle and then directed to a horizontal tube runway for controlled cooling of the glass tubing to a temperature at which the glass tubing can be cut to length without deforming the glass tubing.

SUMMARY

Accordingly, a need exists for apparatuses, systems, and methods for heating and cooling glass tubing during formation of the glass tubing. In particular, a need exists for apparatuses, systems, and methods for heating and cooling glass tubing during formation of the glass tubing and before introducing the glass tubing to the tube runway.

According to one or more aspects of the present disclosure, a muffle for a glass tube forming process includes an inlet end coupled to a bowl for producing glass tubing, an outlet end having an inner dimension larger than an inner dimension of the inlet end, and a sidewall extending from the inlet end to the outlet end. A radial distance from a center axis of the muffle to an inner surface of the sidewall increases from the inlet end to the outlet end, and the sidewall may be substantially free of abrupt changes in the radial distance from the center axis to the inner surface that produce instability regions within the muffle. The muffle may further include a channel positioned between an outer surface of at least a portion of the sidewall and an insulating layer disposed about the sidewall. The channel may be operable to pass a heat transfer fluid into thermal communication with the sidewall to control a temperature of at least a portion of the inner surface of the sidewall.

According to one or more other aspects of the present disclosure, a system for producing glass tubing includes a bowl and a muffle. The bowl includes at least one cylindrical container having an orifice ring extending from a bottom of the cylindrical container, the orifice ring defining an orifice in the bottom of the cylindrical container. The bowl further includes a blow tube disposed within the cylindrical container and extending through the orifice. The blow tube operable to deliver a gas flow proximate the orifice ring. The muffle includes an inlet end coupled to the bowl, an outlet end having an inner dimension larger than an inner dimension of the inlet end, and a sidewall extending from the inlet end to the outlet end. A radial distance from a center axis of the muffle to an inner surface of the sidewall increases from the inlet end to the outlet end. The inner surface of the sidewall may be substantially free of abrupt changes in the radial distance from the center axis to the inner surface that produce instability regions within the muffle. The muffle may further include a channel positioned between an outer surface of the sidewall and an insulating layer disposed about the sidewall. The channel may be operable to pass a heat transfer fluid into thermal communication with the sidewall to provide cooling to the sidewall. The muffle may be operable to control a temperature of the glass tubing drawn from the bowl.

According to one or more other aspect of the present disclosure, a glass tube forming process may include drawing glass tubing from a bowl and passing the glass tubing through a muffle. The muffle may include an inlet end having an inlet positioned to receive the glass tubing from the bowl, an outlet end having an inner dimension larger than an inner dimension of the inlet end, and a sidewall extending from the inlet end to the outlet end. A radial distance from a center axis of the muffle to the inner surface of the sidewall increases from the inlet end to the outlet end, and the inner surface of the sidewall is substantially free of abrupt changes in the radial distance from the center axis to the inner surface that produce instability regions within the muffle. The method may further include cooling the glass tubing passing through the muffle. Cooling the glass tubing may include passing a heat transfer fluid through a channel positioned between an outer surface of a portion of the sidewall and an insulating layer disposed about the sidewall, wherein the channel is in thermal communication with the sidewall.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 7A depicts an embodiment of the muffle having a shape that is frustoconical in which the sidewall is straight and angled;

FIG. 7B depicts an embodiment of the muffle having an upper section and a lower section of the sidewall that are both frustoconical in shape but have different slopes of the inner surface of the sidewall;

FIG. 7C depicts an embodiment of the muffle having a sidewall that includes the upper section, a first lower section, and a second lower section which may each be frustoconical in shape with the sidewall in each axial section having a different slope;

FIG. 7D depicts an embodiment of the muffle having a sidewall that includes an upper section that is cylindrical and a lower section that is curved outward from the upper section;

FIG. 7E depicts an embodiment of the muffle having a single axial section, and the sidewall may be continuously curved outward from an inlet end to an outlet end 142;

FIG. 7F depicts an embodiment of the muffle having the sidewall which include the upper section with a frustoconical shape and a lower section with a curved shape:

FIG. 7G depicts an embodiment of the muffle in which a lower section of the sidewall may be asymmetrical relative to a center axis A of the;

DETAILED DESCRIPTION

Figure 4:
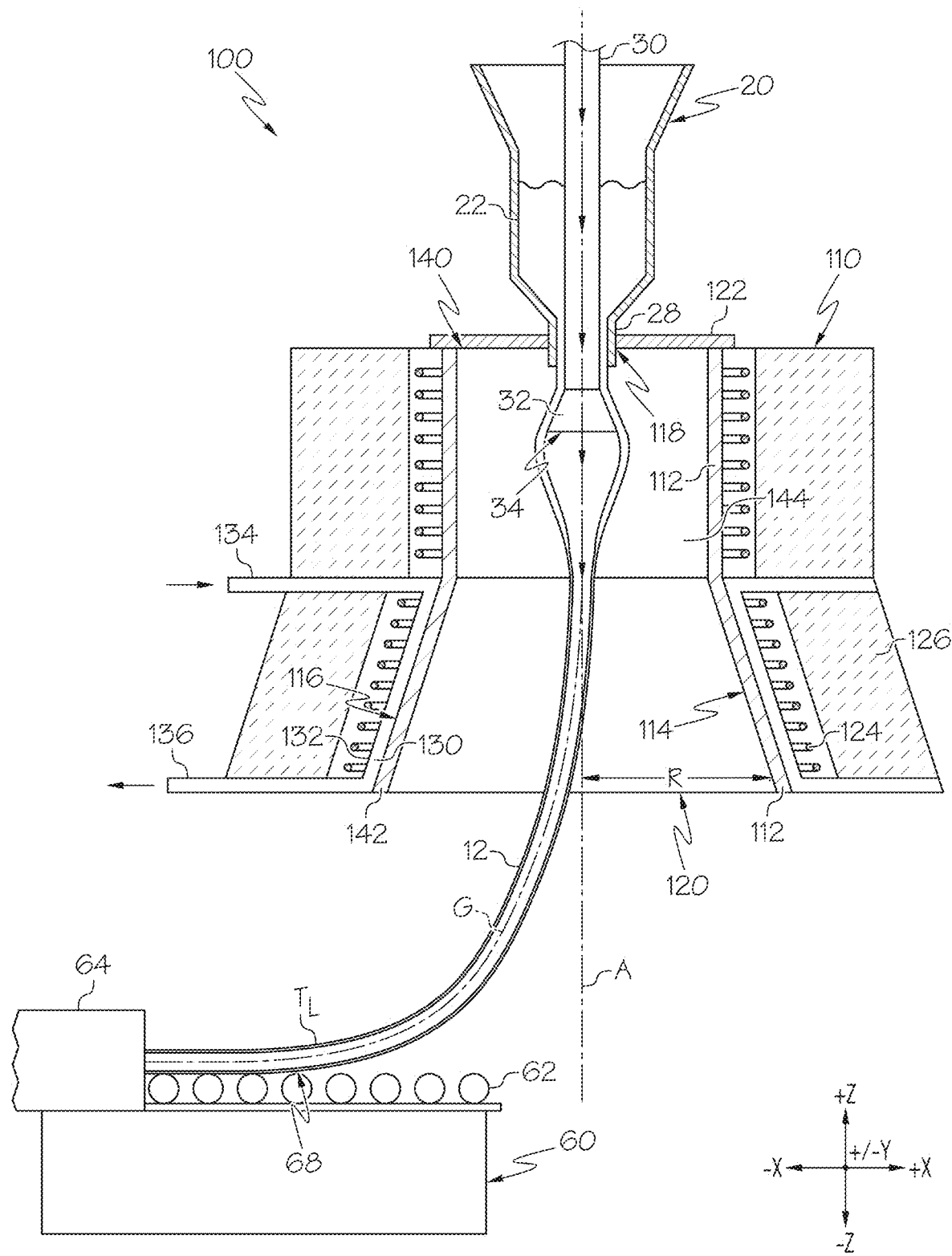
FIG. 4 schematically depicts a partial cross-sectional view of a process for forming glass tubing, according to one or more embodiments shown and described herein.

Reference will now be made in detail to embodiments of apparatuses, systems, and methods for continuously producing glass tubing, examples of which are illustrated in the accompanying drawings. Whenever possible, the same reference numerals will be used throughout the drawings to refer to the same or like parts. The present disclosure is directed to a muffle for a glass tube forming process. Referring to FIG. 4, a system 100 including the muffle 110 of the present disclosure for conducting a glass tube forming process is depicted. The muffle 110 may include an inlet end 140 coupled to a bowl 20 for producing glass tubing 12 and an outlet end 142 having an inner dimension larger than an inner dimension of the inlet end 140. The muffle 110 may further include a sidewall 112 extending from the inlet end 140 to the outlet end 142. A radial distance R from a center axis A of the muffle 110 to an inner surface 114 of the sidewall 112 may increase from the inlet end 140 to the outlet end 142 and the sidewall 112 may be substantially free of abrupt changes in the radial distance R from the center axis A to the inner surface 114 that produce instability regions within the muffle 110. The muffle 110 may further include a channel 130 disposed between an outer surface 116 of at least a portion of the sidewall 112 and an insulating layer 126 disposed about the sidewall 112. The channel 130 may be operable to pass a heat transfer fluid into thermal communication with the sidewall 112 to provide passive cooling to at least a portion of the inner surface 114 of the sidewall 112. The muffle 110 of the present disclosure may enable the system 100 for conducting the glass tube forming process to operate at greater glass flow rates (e.g., greater draw speeds or larger glass tubing) by eliminating instability regions within the muffle 110 to reduce variations in the temperature and movement of the air in the muffle 110 and providing passive cooling of the glass tubing 12 in the muffle 110.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Directional terms as used herein—for example up, down, right, left, front, back, top, bottom—are made only with reference to the figures as drawn and the coordinate axis provided therewith and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "siding" refers to the difference between the minimum wall thickness and the maximum wall thickness of a glass tube or the difference between the minimum layer thickness and maximum layer thickness of a glass layer of a composite glass tube, where the minimum and maximum wall thicknesses or minimum and maximum glass layer thicknesses are determined from a cross-section of the glass tube.

As used herein, "axial" refers the +/−Z direction of the coordinate axis provided in the figures.

Figure 5:
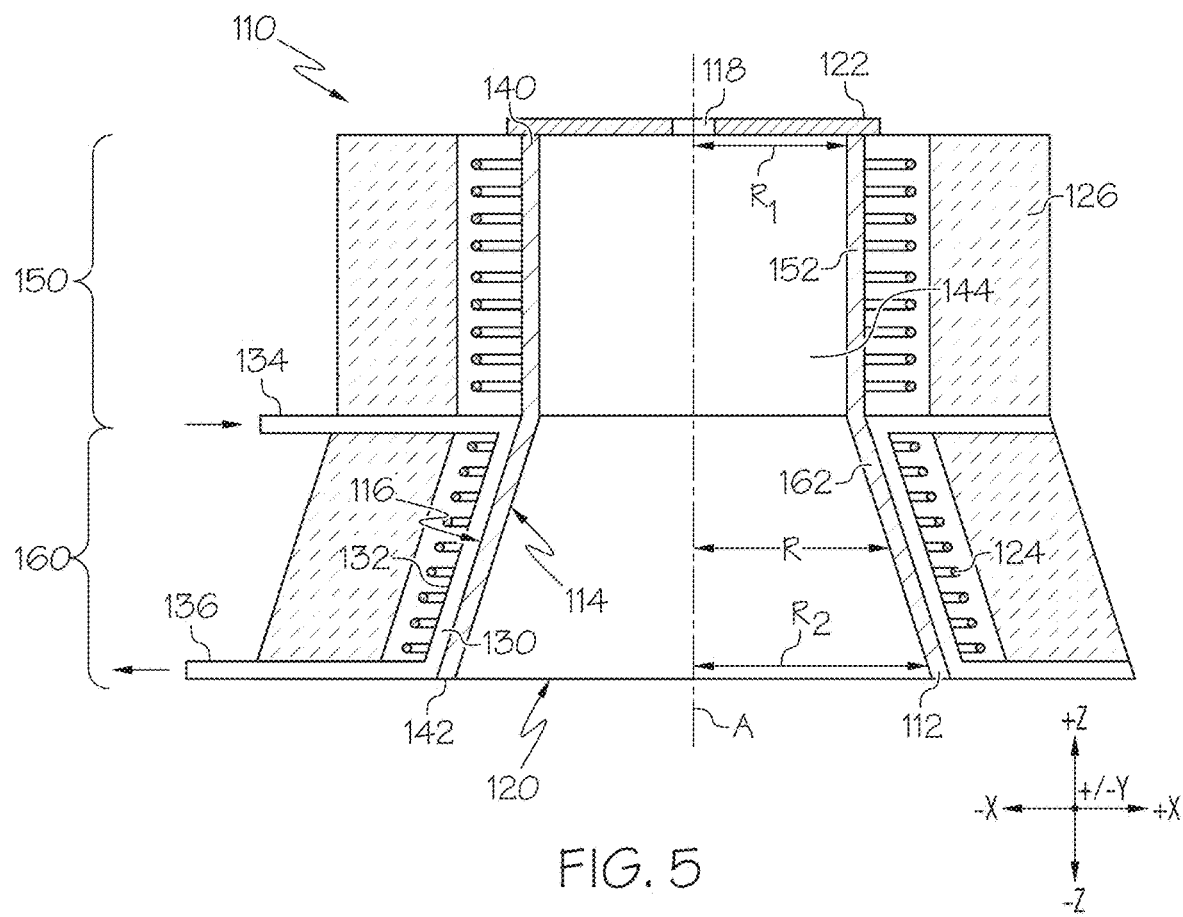
FIG. 5 schematically depicts a partial cross-sectional view of a muffle of the process for forming glass tubing of FIG. 4, according to one or more embodiments shown and described herein.

As used herein, "radial distance" refers to a distance measured from the center axis A of the muffle outward in a direction perpendicular to the center axis A of the muffle (i.e., a distance from the center axis A in the X-Y plane of the coordinate axis in FIGS. 4 and 5). The term "radial distance" is not intended to limit the cross-sectional shape of the muffle disclosed herein to circular or elliptical cross sections, and the term "radial distance" is intended to apply equally to the distance from a centerline A of a muffle having a polygonal or irregular-shaped cross-section.

As used herein, "indirect cooling" refers to cooling accomplished without contact of a cooling device or cooling fluid with the glass tubing. "Direct cooling" refers to cooling in which a cooling fluid or cooling device directly contacts the glass tubing.

As used herein, "continuously producing" refers to operation of a process for producing glass tubing that is continuous or semi-continuous compared to a batch process. Continuous operation may include periods of start-up, shutdown, and process interruptions.

Figure 1:
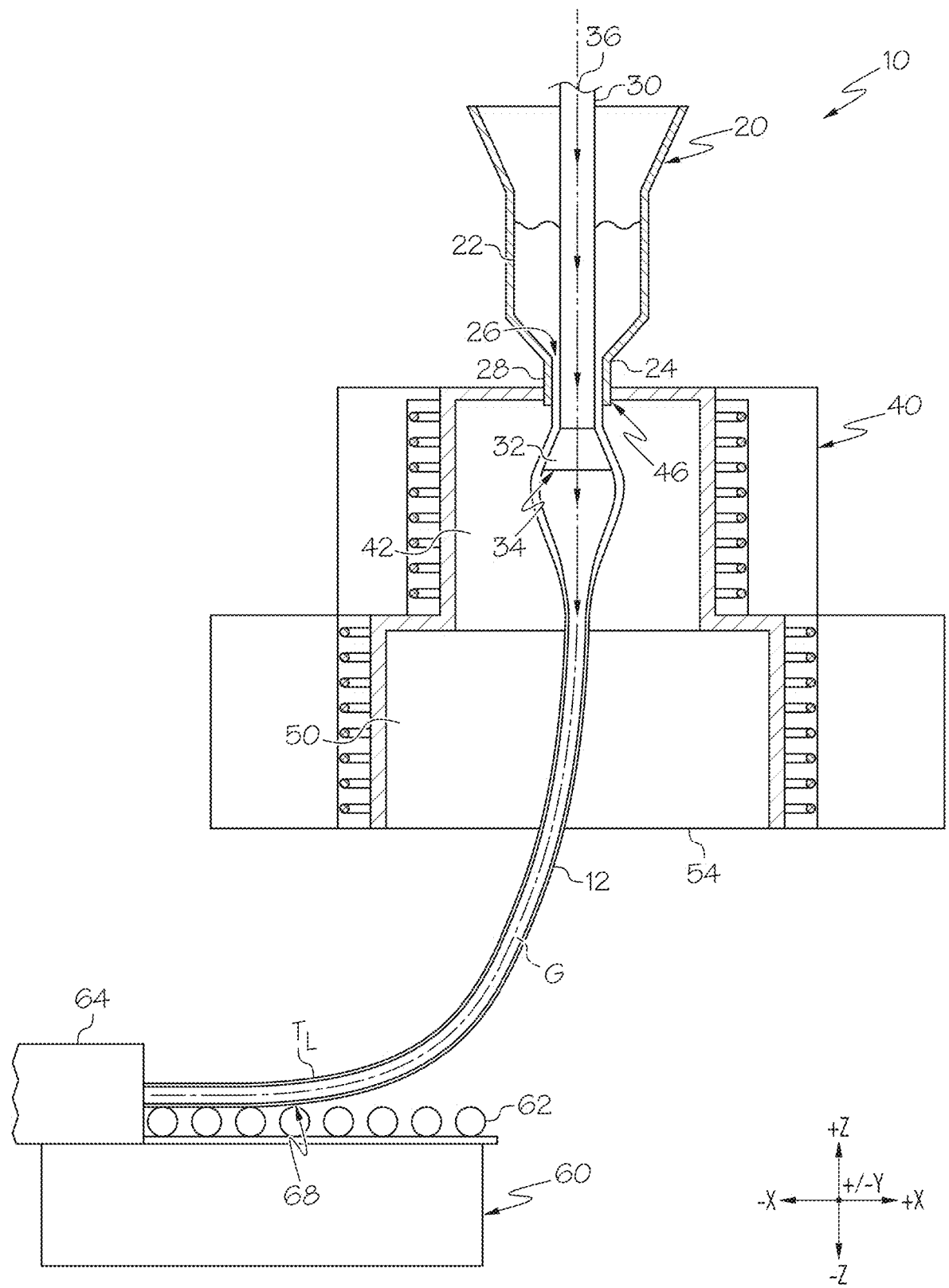
FIG. 1 schematically depicts a partial cross-sectional view of a process for forming glass tubing of the prior art having a muffle with two cylindrical sidewall sections of different diameters.

Referring to FIG. 1, a Vello process 10 for forming glass tubing 12 is depicted. The process 10 includes a bowl 20, a muffle 40 having an inlet 46 positioned to receive the glass tubing 12 drawn from the bowl 20, and a tube runway 60 positioned to receive the glass tubing 12 from an outlet 54 of the muffle 40. The bowl 20 includes a cylindrical container 22, which may have an orifice 26 defined in a bottom 24 of the cylindrical container 22. The bowl 20 may further include an orifice ring 28, which may be coupled to the bottom 24 of the cylindrical container 22 at the orifice 26. A hollow blow tube 30 may be disposed within the cylindrical container 22 and may have a proximal end 34 that extends through the orifice 26 and the orifice ring 28. The proximal end 34 of the blow tube 30 may include a hollow head 32, a part of which may be positioned below the orifice ring 28. The muffle 40 may include a first portion 42 proximate the bowl 20 and a second portion 50 coupled to the first portion 42. The tube runway 60 may be horizontally oriented (i.e., oriented in the +/−Z direction of the coordinate axis of FIG. 1) and may include a plurality of rollers (which may be referred to herein as the diabolos 62) and a heat transfer chamber 64.

Forming the glass tubing 12 may generally include introducing a molten glass composition to the cylindrical container 22 of the bowl 20. The molten glass may flow downward (i.e., in the −Z direction of the coordinate axis in FIG. 1) through the orifice 26 and the annular space between the orifice ring 28 and the head 32 of the blow tube 30. The glass tubing 12 having centerline G may be drawn from the head 32 of the blow tube 30. Air may be passed through the blow tube 30, and into the interior of the glass tubing 12 to maintain the internal cavity of the glass tubing 12. The glass tubing 12 may be drawn through a catenary in the muffle 40 to the tube runway 60, which is oriented horizontally (i.e., in the +/−X direction of the coordinate axis of FIG. 1) and positioned below the muffle 40. In the tube runway 60, the glass tubing 12 may be subjected to controlled cooling in the heat transfer chamber 64 to produce the glass tubing 12. The dimensions of the glass tubing 12 may be influenced by the glass temperature, the rate of draw (draw speed), the pressure of the blowing air passed through the blow tube 30, the relative dimensions of the head 32 of the blow tube 30 and the orifice ring 28, the temperature of the molten glass in the orifice 26, and the temperature of the glass tubing 12 passing through the muffle 40.

Referring still to FIG. 1, the landing temperature $T_L$ of the glass tubing 12 may depend on the glass flow rate, which may depend on the draw speed and dimensions of the glass tubing 12 being produced. The "landing temperature" is the temperature of the glass tubing 12 at the location 68 where the glass tubing 12 first contacts or "lands" on the diabolos 62 and may be indicative of the viscosity of the glass in the landing area. The landing temperature $T_L$ of the glass tubing 12 may be controlled by controlling heating and/or cooling of the glass in the orifice 26, the muffle 40, or both. Incorrect temperature control in the orifice 26 and/or the muffle 40 can result in an incorrect landing temperature $T_L$, which can negatively impact attributes of the glass tubing 12 and introduce instability into downstream processes.

For example, if the landing temperature $T_L$ is too cold, the glass tubing 12 may be too viscous in the catenary, which may result in the catenary being too long and the landing position too far from the centerline A of the muffle 110. The long catenary resulting from lesser air temperatures and thus increased glass viscosity in the muffle 110, may adversely affect the dimensions of the glass tubing 12 and may cause interference between the muffle 110 and the glass tubing 12 passing through the muffle 110. Additionally, a long catenary resulting from lesser landing temperature may cause interferences with downstream processes, which may prevent the downstream processes from processing the glass tubing 12 to achieve the target attributes. Further, a long catenary resulting from lesser landing temperatures may cause the curvature of the catenary to remain in the glass, resulting in the glass tubing 12 exhibiting tube bow. If the landing temperature $T_L$ is too hot, the viscosity of the glass tubing 12 may be too low and the catenary may be too short (i.e., too close to the center axis A of the muffle 110). If the viscosity of the glass is too low, the shorter catenary may result in deformation of the glass in the turn, which can lead to variability in the dimensions of the glass tubing 12, sagging, or surface marks. In either of these cases, incorrect landing temperature $T_L$ can negatively impact attributes and quality of the glass tubing 12, such as by introducing strength limiting flaws in the glass tubing 12, introducing optical distortions in the glass tubing 12, and/or altering the dimensions of the glass tubing 12 (e.g., such as but not limited to creating siding, introducing variation in the outer or inner dimensions of the glass tubing 12, or causing out-of-roundness or tube bow).

Figure 2:
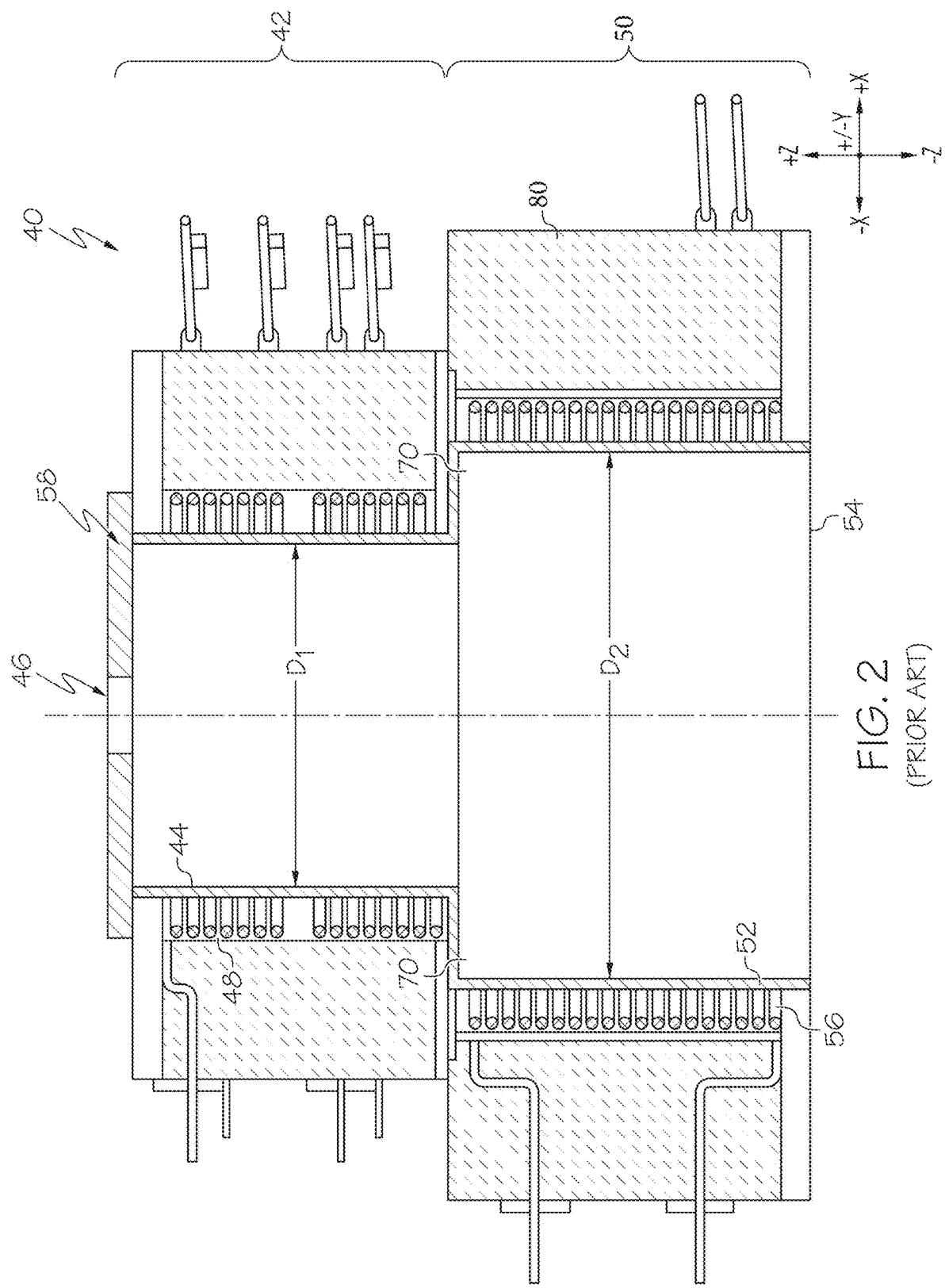
FIG. 2 schematically depicts a partial cross-sectional view of the muffle of the process for forming glass tubing of FIG. 1.

Referring to FIG. 2, a typical muffle 40 used in the Vello process 10 is depicted. The first portion 42 of the muffle 40 may include a first sidewall 44 that is generally cylindrical and has a first inner diameter D1. The second portion 50 may include a second sidewall 52 that is also generally cylindrical and has a second inner diameter D2 that is greater than the first inner diameter D1 of the first sidewall 44. The greater diameter of the second sidewall 52 may allow space within the muffle 40 for the glass tubing to follow a catenary path from the orifice ring 28 of the bowl 20 to the tube runway 60 without contacting the muffle 40. The first portion 42 of the muffle 40 may include a first heater 48, and the second portion 50 may include a second heater 56. The first heater 48 and the second heater 56 may be any type of heating device capable of providing heat to the first sidewall 44 and the second sidewall 52, respectively.

Demands for pharmaceutical containers and other containers and articles made from glass tubing are increasing. To satisfy the increasing demand, production rates of glass tubing 12 are also increasing. For example, in some Vello processes for producing glass tubing, the production rates may need to be increased by two or three times current production rates to meet the increasing demand. Greater production rates may be accomplished by increasing the glass flow rates in the process. Increasing the glass flow rates may include increasing the draw speeds of the glass tubing 12, which may reduce the residence time of the glass tubing 12 in the muffle 40. Reducing the residence time of the glass tubing 12 in the muffle 40 may reduce the heat transfer away from the glass tubing 12, which may increase the landing temperature $T_L$. Additionally, glass flow rate may increase as a result in increasing the outer diameter and/or thickness of the glass tubing 12. Formation of larger diameter glass tubing 12 (e.g., diameters greater than or equal to about 20 mm) at greater draw speeds (i.e., draw speeds greater than about 70 feet per minute (0.3556 meters per second)) requires significant cooling, such as up to 15 kilowatts (kW) of cooling for example.

Figure 3B:
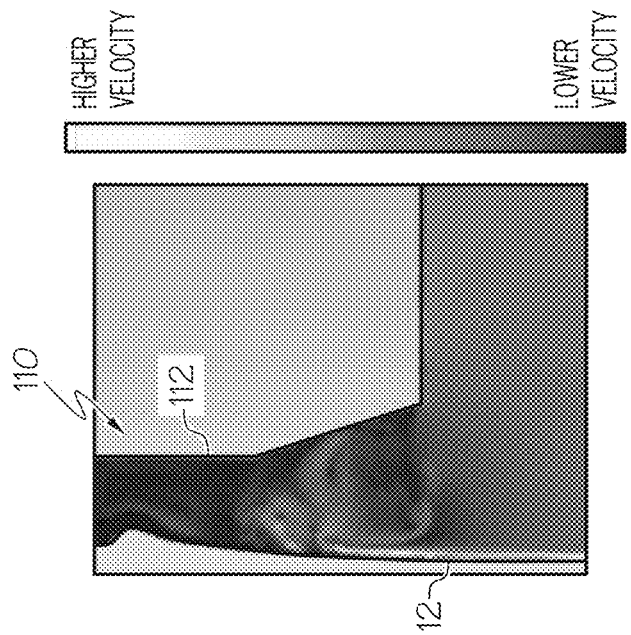
FIG. 3B graphically depicts a gas velocity profile resulting from flow modeling of a muffle having a cylindrical upper portion and a frustoconical lower portion, according to one or more embodiments shown and described herein.
Figure 3A:
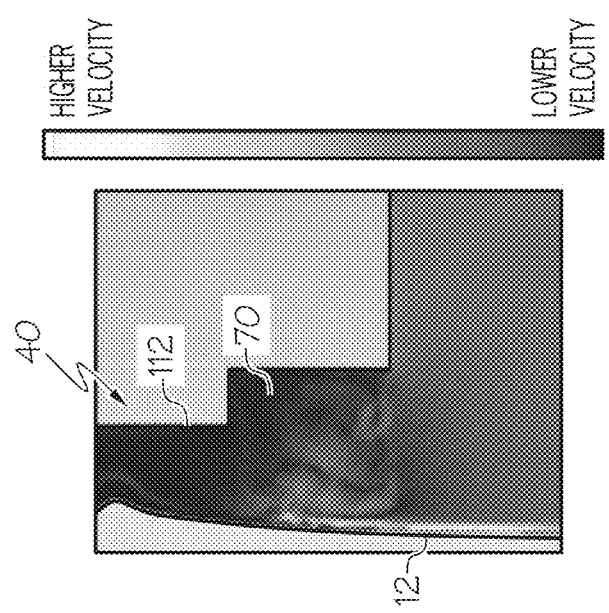
FIG. 3A graphically depicts a gas velocity profile resulting from flow modeling of the muffle of FIG. 2.

At the greater glass flow rates required to meet the increasing demand for glass tubing 12 or make larger diameter glass tubing 12, the muffle 40 shown in FIG. 1 is not capable of removing an amount of heat from the glass tubing 12 sufficient to control the landing temperature $T_L$ of the glass tubing 12 and may cause instability in temperature and movement of gases within the muffle 110 that can result in variations in the dimensions of the glass tubing 12. Passage of the glass tubing 12 through the muffle 110 induces movement of the gases within the muffle 110, resulting in flow patterns of the gases within the muffle 110. As previously described in relation to FIG. 2, the muffle 40 of the prior art generally includes the first portion 42 having the first diameter D1 and the second portion 50 having the second diameter D2 greater than the first diameter D1. The abrupt change in the diameter of the muffle 40 at the transition from diameter D1 in the first portion 42 to diameter D2 in the second portion 50 creates instability regions 70 in which the movement or flow patterns of gasses within the muffle 40 become unstable (i.e., exhibit increased turbulence characterized by formation of vortices in the flow patterns of the gas). Instability in the movement or flow patterns of gases within the muffle 110 may result in instability in the temperature of the gases within the muffle 110 leading to variations in the temperature of the glass tubing 12 due to the chimney effect. Referring to FIG. 3A, mathematical modeling of the velocities of the gases within the muffle 40 shows the instability regions 70 that form in the second portion 50 of the muffle 40 proximate the transition between the first portion 42 and the second portion 50 (i.e., proximate the change in diameter from D1 to D2). This instability in the movement and flow patterns in the glass caused by the instability regions 70 of the muffle 40 increases instability in the temperature of the gases in the muffle 110, which results in variability in the glass temperature along the catenary and the landing temperature $T_L$ of the glass tubing 12. The variations in glass temperature within the muffle 110 translate to variations in the dimensions of the glass tubing 12.

Additionally, the conventional muffles 40 generally include the first heater 48 and the second heater 56 for heating the inner surfaces of the muffle 40, but do not include means of cooling the inner surfaces of the muffle 40. Therefore, heat removal from the glass tubing 12 in the muffle 40 may be limited by conduction of the heat through the sidewalls of the muffle and refractory material 80 surrounding the muffle 40, which acts as an insulator. The heat transfer away from the muffle 40 may be increased by reducing or eliminating the refractory material 80 surrounding the muffle 40 to reduce the resistance to heat transfer away from the muffle 40. However, it has been found that removing the refractory material 80 from the muffle 40 does not increase the heat transfer rate away from the glass tubing 12 to a heat transfer rate great enough to control the landing temperature $T_L$ of the glass tubing 12 at the greater glass flow rates (e.g., greater than 800 lbs/hour). The glass tubing 12 may also be cooled in the conventional muffle 40 by introducing a cooling fluid, such as an inert gas, into the interior cavity of the muffle 40. However, direct cooling of the glass tubing 12 using a cooling fluid introduced into the muffle 40 may alter the properties or dimensions of the glass tubing 12, which may still be in a low viscosity condition within the muffle 40.

The present disclosure is directed to a muffle for a glass tube forming process, the muffle providing a heat transfer rate sufficient to control the landing temperature $T_L$ of the glass tubing at the diabolos. Referring now to FIG. 4, the system 100 for the glass tube forming process that includes the muffle 110 of the present disclosure is depicted. The muffle 110 may include an inlet 118 at an inlet end 140 of the muffle, the inlet 118 positioned to receive the glass tubing 12 drawn from the bowl 20 for producing the glass tubing 12. The muffle 110 may also include the outlet 120 at the outlet end 142 of the muffle 110. The outlet end 142 of the muffle 110 may have inner dimension greater than an inner dimension of the inlet end 140. In some embodiments, the muffle 110 may be coupled to the bowl 20, such as to the orifice ring 28 of the bowl 20. For example, in some embodiments, the bowl 20 may include the orifice ring 28, and the muffle 110 may be coupled to the orifice ring 28 so that at least a portion of the orifice ring 28 extends into the inlet 118 of the muffle 110. In some embodiments, the muffle 110 may be mounted in a fixed position relative to the bowl 20 rather than being coupled to the bowl 20.

The muffle 110 may further include a sidewall 112 extending from the inlet end 140 to the outlet end 142. A radial distance R from a centerline A of the muffle 110 to an inner surface 114 of the sidewall 112 may be greater proximate the outlet end 142 compared to proximate the inlet end 140. As previously discussed herein, the radial distance R is a distance from the centerline A to the inner surface 114 measured in a direction perpendicular to the centerline A, and is not intended to be indicative of a circular or elliptical cross-sectional geometry. Additionally, the sidewall 112 may be substantially free of abrupt changes in the radial distance R from the centerline A to the inner surface 114 of the muffle 110. In other words, the inner surface 114 of the muffle 110 may not include a step change in the radial distance R from the inner surface 114 to the centerline A. Instead, the inner dimension of the sidewall 112 of the muffle 110 may gradually increase from a first radial distance R1 proximate the inlet end 140 of the muffle 110 to a second radial distance R2 proximate the outlet end 142 of the muffle 110 over at least a portion of the sidewall 112. The muffle 110 may also include a channel 130, which may be positioned between an outer surface 116 of at least a portion of the sidewall 112 and an insulating layer 126 disposed about the sidewall 112. The channel 130 may be operable to pass a heat transfer fluid into thermal communication with the sidewall 112 to control a temperature of at least a portion of the inner surface 114 of the sidewall 112.

Referring still to FIG. 4, the glass tubing 12 having centerline G may be drawn from the orifice ring 28 and may travel in a catenary through the muffle 110 to the tube runway 60. The muffle 110 of the present disclosure may reduce instability in the temperature and flow patterns of the gas in the muffle 110 by reducing or eliminating instability regions 70 (FIG. 2). Reducing or eliminating instability regions 70 within the muffle 110 may decrease the instability in the air temperature and air flow patterns within the muffle 110. Reducing instability in the air temperature and air flow patterns within the muffle 110 may reduce variability in the temperature of the glass in the muffle 110, thereby reducing variations in the dimensions of the glass tubing 12. Additionally, the muffle 110 of the present disclosure may increase heat transfer away from the glass tubing 12 as it passes through the muffle 110 by providing cooling to at least a portion of the inner surface 114 of the sidewall 112. Increasing the heat transfer rate may enable the muffle 110 to cool the glass tubing 12 sufficiently to achieve and/or control the landing temperature $T_L$ of the glass tubing 12 at greater glass flow rates, such as for producing the glass tubing 12 at draw speeds greater than or equal to 70 feet per minute (0.3556 meters per second) and/or for producing glass tubing 12 having greater dimensions, such as outer diameters greater than or equal to 20 mm, or even greater than or equal to 50 mm. Thus, the muffle 110 of the present disclosure may enable the system 100 for conducting the glass-tube forming process to operate at greater glass flow rates, such as flow rates greater than or equal to 800 pounds per hour (lbs/hr or 363 kilograms per hour). The muffle 110 of the present disclosure will now be described in further detail.

Referring to FIG. 5, an embodiment of the muffle 110 is depicted. As previously described, the muffle 110 may include the sidewall 112, the insulating layer 126 surrounding the sidewall 112, and the channel 130 located between the insulating layer 126 and the sidewall 112. The muffle 110 may optionally include one or a plurality of heating elements 124 disposed between the sidewall 112 and the insulating layer 126, such as between the channel 130 and the insulating layer 126.

Referring again to FIG. 4, the sidewall 112 may extend radially about a center axis A of the muffle 110 to form an interior cavity 144 of the muffle 110. The sidewall 112 may also extend in a generally axial direction between the inlet end 140 of the muffle 110 and the outlet end 142 of the muffle 110. In some embodiments, the muffle 110 may include a top plate 122 coupled to the inlet end 140 of the sidewall 112. The inlet end 140 of the sidewall 112 may be the end of the sidewall 112 proximate the bowl 20 (i.e., the end of the sidewall 112 in the +Z direction of the coordinate axis in FIG. 5 relative to the outlet end 142). In some embodiments, the top plate 122 may define the inlet 118 to the muffle 110 and may be coupled to the orifice ring 28 of the bowl 20. The inlet 118 to the muffle 110 defined by the top plate 122 may have radial dimensions less than the inner dimension of the muffle 110 at the inlet end 140 of the muffle 110. In some embodiments, a portion of the orifice ring 28 and/or the proximal end 34 of the blow tube 30 may extend through the inlet 118 defined in the top plate 122 and into the interior cavity 144 of the muffle 110. The outlet 120 may be disposed at the outlet end 142 of the sidewall 112. In some embodiments, a cover (not shown) may be coupled to the outlet end 142 of the muffle 110 to reduce a size of the outlet 120 relative to the inner dimension of the muffle 110 at the outlet end 142 of the muffle 110.

Referring now to FIG. 5, an inner dimension of the sidewall 112 proximate the outlet end 142 may be greater than the inner dimension of the sidewall 112 proximate the inlet end 140 so that the cross-sectional area of the muffle 110 at the outlet end 142 is greater than the cross-sectional area of the muffle 110 at the inlet end 140. The inner dimension may be the radial distance R measured from center axis A of the muffle 110 to the inner surface 114 of the sidewall 112 in a direction perpendicular to the center axis A. In some embodiments, the sidewall 112 may have a first radial distance R1 proximate the inlet end 140 and a second radial distance R2 proximate the outlet end 142. The second radial distance R2 may be greater than the first radial distance R1. The greater inner dimension of the sidewall 112 proximate the outlet end 142 compared to the inner dimension proximate the inlet end 140 may enable the glass tubing 12 to follow a catenary path from the blow tube 30 (FIG. 4), through the muffle 110, and to the diabolos 62 (FIG. 4) without the glass tubing 12 contacting the inner surface 114 of the sidewall 112 or any other part of the muffle 110.

The inner dimension (e.g., radial distance R) of the sidewall 112 may increase with decreasing axial position (i.e., position in the +/−Z direction of the coordinate axis of FIG. 4) along the sidewall 112 or at least a portion of the sidewall 112. In some embodiments, the inner dimension of the sidewall 112 may increase gradually with respect to axial position of the axial portion of the sidewall 112. For example, in some embodiments, the muffle 110 may include an upper portion 150 proximate the bowl 20 and one or more lower portions 160 below the upper portion 150 (i.e., in the −Z direction of the coordinate axis of FIG. 5 relative to the upper portion 150). In at least one of the lower portions 160 of the muffle 110, the radial distance R of the sidewall 112 may increase gradually from the first radial distance R1 to the second radial distance R2 (as shown in FIG. 5, the radial distance R of the sidewall 112 in the upper portion 150 may be constant and equal to the first radial distance R1).

In some embodiments, the sidewall 112 may be substantially free of abrupt changes in the radial distance from the center axis A to the inner surface 114 of the sidewall 112 that result in instability regions within the muffle 110. "Substantially free of abrupt changes" may refer to the sidewall 112 being free of step changes and/or steep changes in the radial distance from the center axis A to the inner surface 114 of the sidewall 112 that are substantial enough to produce instability regions (e.g., instability regions 70 depicted in FIGS. 1 and 2) that instability in the temperature or movement/flow patterns of the gases in the muffle 110. A "step change" in the radial dimension may refer to a change in the radial dimension characterized by a ratio of the change in axial position to the change in radial position equal to zero. A "steep change" in the radial distance from the center axis A to the inner surface 114 of the sidewall 112 may refer to a change in the radial distance characterized by a slope of a plot of the radial distance as a function of axial position in the muffle 110 that has an absolute value of greater than 2 or is undefined (i.e., step change in which the radial distance changes at a single point such that the slope has a denominator of 0 and is therefore undefined). Changes in the radial distance from the center axis A to the inner surface 114 of the sidewall 112 within the muffle 110 may refer to changes in the radial distance R based on the inner surface 114 that occur between the inlet end 140 and the outlet end 142. It is not intended for changes in the radial distance described herein to include changes in radial distance that occur at the axial boundaries of the sidewall 112 at the inlet end 140 and the outlet end 142 of the muffle 110 (e.g., such as changes in the radial distance at the interface with the top plate 122 or a flange, cover, or other structure coupled to the outlet end 142 of the sidewall 112).

Figure 6:
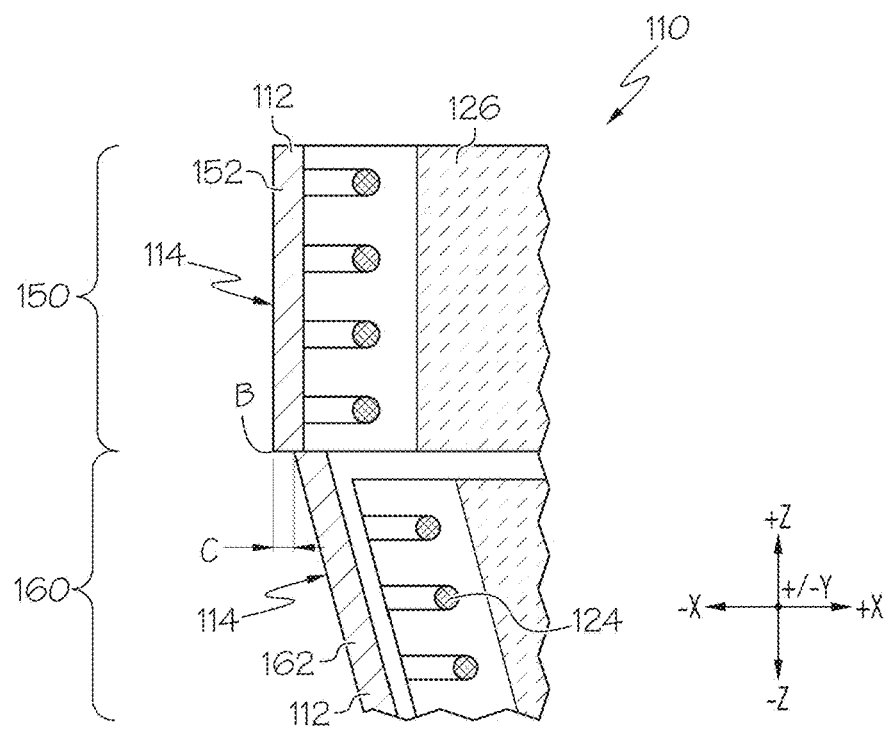
FIG. 6 schematically depicts a partial cross-section of a transition between an upper portion and a lower portion of the muffle of FIG. 5, according to one or more embodiments shown and described herein.

In some embodiments, the inner surface 114 of the sidewall 112 may be substantially free of step changes in the radial distance R from the center axis A of the muffle 110 to the inner surface 114 of the sidewall 112 that result in instability regions in the muffle 110. Referring to FIG. 6, a portion of the sidewall 112 is depicted in which the inner surface 114 may include a step change at point B, where the inner surface 114 of the sidewall 112 extends generally radially outward before continuing in a downward direction (i.e., in direction having at least a direction vector in the −Z direction of the coordinate axis of FIG. 6). At the step change at point B, the radial distance between the inner surface 114 of the sidewall 112 and the center axis A (FIG. 5) may increase or decrease by a distance C, which may have an absolute value of less than 0.25 inches (0.635 cm, where 1 inch is equal to 2.54 cm). When a step change in the radial distance R between the inner surface 114 of the sidewall 112 and the center axis A of greater than 0.25 inches is present, the abrupt change in the radial distance R may be sufficient to produce instability regions and/or vortices in the gas flow within the muffle 110, which may result in increased instability in the temperature and movement of gases within the muffle 110.

The step change at point B is depicted in FIG. 6 at the transition between the upper portion 150 and the lower portion 160 of the muffle 110. However, it is understood that the position of a step change is not limited to the transition between the upper portion 150 and the lower portion 160 of the muffle 110 but may be at any point on the inner surface 114 of the sidewall 112. In some embodiments, the inner surface 114 of the sidewall 112 may be substantially free of step changes in the radial distance from the center axis A of the muffle 110 to the inner surface 114 of the sidewall 112 of greater than 0.25 inches (0.635 cm). For example, in some embodiments, the inner surface 114 of the sidewall 112 may be free of step changes in the radial distance R from the center axis A of the muffle 110 to the inner surface 114 of the sidewall 112 having an absolute value greater than 0.20 inches, greater than 0.15 inches, or even greater than 0.10 inches. In some embodiments, step changes in the radial distance R between the inner surface 114 of the sidewall 112 and the center axis A of the muffle 110 may have an absolute value less than or equal to 0.25 inches (0.635 cm) for the inner surface 114 of the sidewall 112 between the inlet end 140 and the outlet end 142.

The inner surface 114 of the sidewall 112 may additionally be characterized by a plot of the radial distance R from the center axis A of the muffle 110 to the inner surface 114 of the sidewall 112 as a function of axial position (i.e., position in the +/−Z direction of the coordinate axis of FIG. 5). The absolute value of the slope of the plot of radial distance R as a function of axial position indicates the rate of change in the radial distance R per incremental change in the axial position of the muffle 110. In some embodiments, the slope of the plot of radial distance R from the center axis A of the muffle 110 to the inner surface 114 of the sidewall 112 as a function of axial position may have an absolute value less than or equal to 2.0 along the axial length of the muffle 110 between the inlet end 140 and the outlet end 142, wherein the slope of the plot of radial distance R as a function of axial position may be determined as an average slope over a change in axial position of at least 0.25 inches. For example, in some embodiments, the slope of the plot of radial distance from the center axis A of the muffle 110 to the inner surface 114 of the sidewall 112 as a function of axial position may have an absolute value less than or equal to 1.75, less than or equal to 1.5, less than or equal to 1.0, less than or equal to 0.75, or even less than or equal to 0.5, wherein the slope of the plot of radial distance as a function of axial position is determined as an average over a change in axial position of at least 0.25 inches. In some embodiments, the slope of the plot of radial distance as a function of axial position may have an absolute value less than or equal to 2 at every point on the inner surface 114 of the sidewall 112.

The inner surface 114 of the sidewall 112 may also be characterized by a change in the radial distance R from the center axis A to the inner surface 114 of the sidewall 112 per centimeter of axial length of the muffle 110. The change in radial distance R from the center axis A to the inner surface 114 per centimeter of axial length of the muffle 110 may have an absolute value of less than a change in radial distance R sufficient to produce instability regions within the muffle 110. In some embodiments, the change in the radial distance R from the center axis A to the inner surface 114 of the sidewall 112 per centimeter of axial length of the muffle 110 has an absolute value less than 0.635 cm at all positions on the inner surface 114 of the sidewall 112 between the inlet end 140 and the outlet end 142 of the muffle 110. For example, in some embodiments, the change in the radial distance R from the center axis A to the inner surface 114 of the sidewall 112 per centimeter of axial length of the muffle 110 has an absolute value less than 0.60 cm, less than 0.50 cm, or even less than 0.40 cm at all points on the inner surface 114 of the sidewall 112.

As previously discussed, reducing or eliminating abrupt changes in the radial distance from the center axis A to the inner surface 114 of the sidewall 112 sufficient to cause instability regions within the muffle 110 may decrease instability in the temperature and flow patterns of gasses within the muffle 110 compared to conventional muffles (e.g., muffle 40 of FIG. 1) that include abrupt changes in radial distance. Referring to FIG. 3A, a flow model of gas flow velocities in a conventional muffle 40 having a step change in the inner dimension of the sidewall is depicted. In FIGS. 3A and 3B, the lighter shading corresponds to greater gas flow velocities and darker shading corresponds to lesser gas flow velocities. As shown in FIG. 3A, in instability regions 70 in the conventional muffle 40 caused by the abrupt change in the inner dimension of the sidewall, the movement of gases within the conventional muffle 40 becomes unstable. This is illustrated by the darker regions in the proximity of the transition from the upper portion to the lower portion of the conventional muffle 40. When instability regions 70 form within the convention muffle 40, instability in the flow patterns and temperature of the gas intensify within the muffle 110, thereby leading to greater variations in the temperature of the glass tubing 12 and decreased control of variations in the outer diameter or other dimensions of the glass tubing 12.

Referring now to FIG. 3B, a flow model of the air flow velocities in the muffle 110 according to the present disclosure is depicted. The muffle 110 modeled in FIG. 3B included a cylindrical upper portion and a frustoconical lower portion and did not include a step change or steep change in the radial distance R from the inner surface 114 of the sidewall to the center axis A at the transition between the upper portion and the lower portion. As shown in FIG. 3B, when step changes in the inner dimension of the sidewall 112 are eliminated, the instability regions may also be reduced and/or eliminated, thereby decreasing the instability in the velocities and flow patterns of the gases within the muffle 110. Decreasing the instability in the flow patterns of gas within the muffle 110 may decrease the instability in the gas temperatures within the muffle 110, which may reduce variability in the glass temperatures in the muffle thereby reducing variability in the dimensions of the glass tubing 12.

Figure 12:
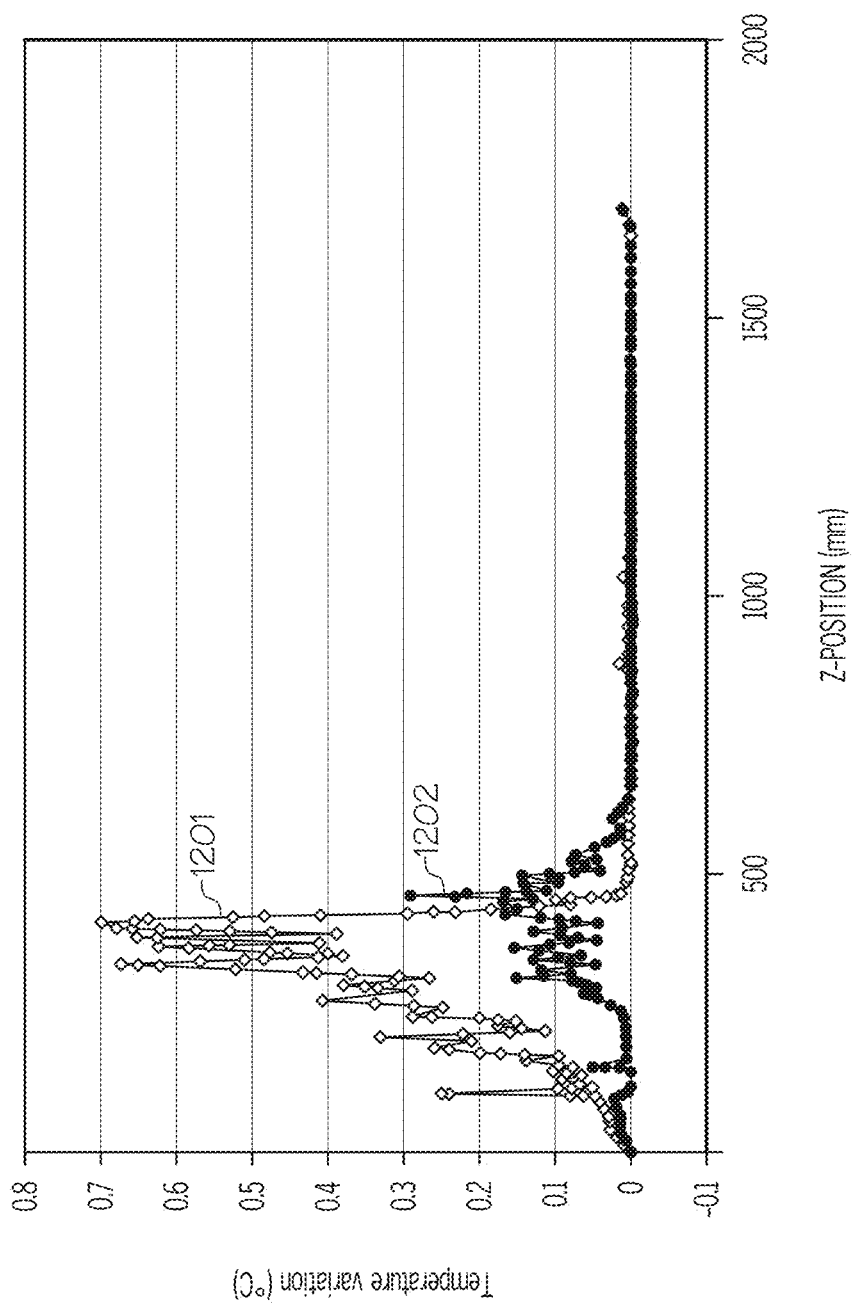
FIG. 12 graphically depicts temperature variation (y-axis) as a function of axial position (Z Position) within the muffle (x-axis) for the muffle of FIG. 2 and the muffle of FIG. 5, according to one or more embodiments shown and described herein.

Referring now to FIG. 12, mathematical modeling of the variability in the temperature of the glass tubing 12 as a function of the axial position within the muffle (e.g., position along the muffle 110 in the +/−Z direction of the coordinate axis of FIGS. 1 and 4) indicates that the muffle 110 of the present disclosure (e.g., muffle 110 of FIG. 4) may provide a reduction in temperature variability of the glass tubing 12 compared to a conventional muffle comprising two cylindrical portions (e.g., muffle 40 of FIG. 1). Mathematical modeling of the temperature variation of the glass tubing 12 as a function of axial position for a conventional muffle (e.g., muffle 40 of FIG. 1) and for a muffle according to the present disclosure (i.e., muffle 110 of FIG. 4) is depicted in FIG. 12. The Z position in FIG. 12 is measured from the inlet end of the muffle 110. Data series 1201 is the temperature variation modeling data for the conventional muffle 40, while data series 1202 is the temperature variation modeling data for muffle 110 of the present disclosure. As demonstrated by FIG. 12, the temperature variability of the glass tube in the muffle 110 (1202) of the present disclosure is substantially less than the temperature variability for the conventional muffle 40 (1201). Thus, muffle 110 of the present disclosure may reduce temperature variability of the glass tubing 12 by eliminating instability regions 70 within the muffle 110.

Referring again to FIG. 5, the sidewall 112 of the muffle 110 may include a plurality of axial sections having different shapes forming a plurality of zones within the muffle 110.

For example, as previously described, the plurality of axial sections of the sidewall may include an upper section 152 and one or a plurality of lower sections 162. In some embodiments, the sidewall 112 may include 2, 3, 4, or more than 4 axial sections (e.g., an upper section 152 and 1, 2, 3, or more than 3 lower sections 162). In some embodiments, the sidewall 112 may include a single axial section in which the inner dimension of the sidewall increases continuously from the inlet end 140 to the outlet end 142 of the sidewall 112.

Figure 7A:
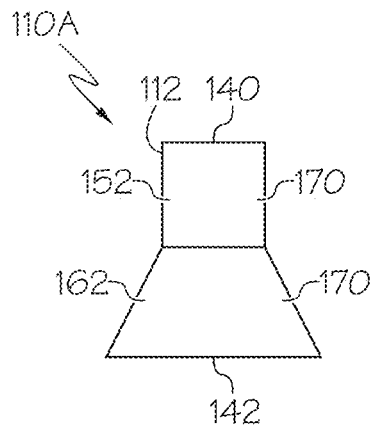
FIGS. 7A, 7B, 7C, 7D, 7E, 7F, and 7G schematically depict side views of various embodiments of a muffle for the process of FIG. 4, according to embodiments shown and described herein.
Figure 7B:
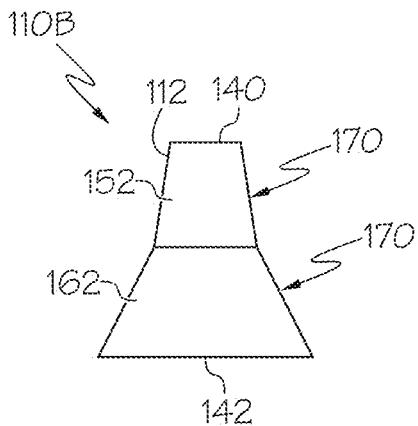
Figure 7C:
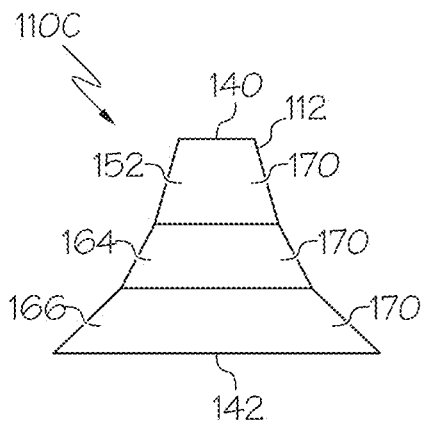
Figure 7D:
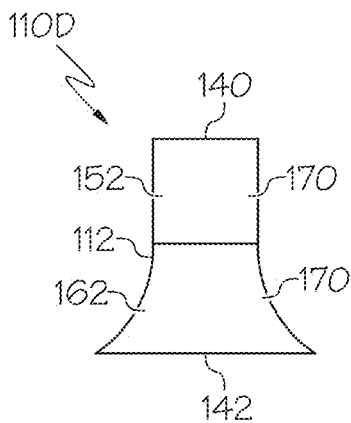

Referring to FIGS. 7A-7G, each of the plurality of axial sections 170 may have a different shape, such as cylindrical, frustoconical, bell-shaped, or other shape. The dimensions, proportions, and slopes in FIGS. 7A-7G are exaggerated for purposes of illustration. In particular, the slopes of the sidewalls 112 in FIGS. 7A-7G are exaggerated to show differences in slope between sections, but are not intended to be indicative of any quantitative value for the slope of the sidewall 112. In some embodiments, at least one axial section 170 may have a shape in which the inner dimension of the sidewall 112 increases with increasing axial position throughout the axial section 170. For example, in some embodiments, at least one axial section 170 may have a shape that is frustoconical in which the sidewall 112 is straight and angled (FIG. 7A). In some embodiments, at least one axial section may be bell-shaped in which the sidewall 112 is curved throughout the axial length of the axial section 170 (FIG. 7D). For axial sections 170 with a curved sidewall 112, the inner surface 114 of the sidewall 112 may be concave, convex, or may transition between concave and convex.

Each of the axial sections 170 may be symmetrical or asymmetrical about the center axis A of the muffle 110. For example, in some embodiments, at least one of the axial sections 170 may be asymmetrical, wherein the radial distance between the inner surface 114 of the sidewall 112 and center axis A may be greater on one side to accommodate the catenary path of the glass tubing 12 passing through the muffle 110. In some embodiments, an asymmetrical axial section of the sidewall 112 may enable the muffle 110 to provide a more consistent distance between the inner surface 114 of the sidewall 112 and the glass tubing 12 at each axial position within the axial section 170, which may provide more consistent heat transfer from the glass tubing 12 in the muffle 110 compared to a symmetrical sidewall.

Figure 7E:
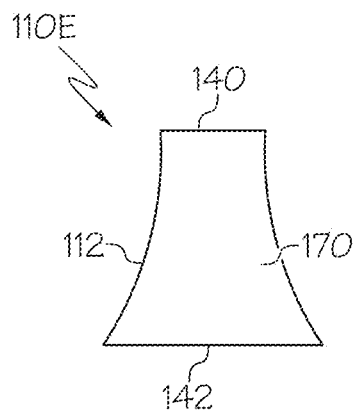
Figure 7F:
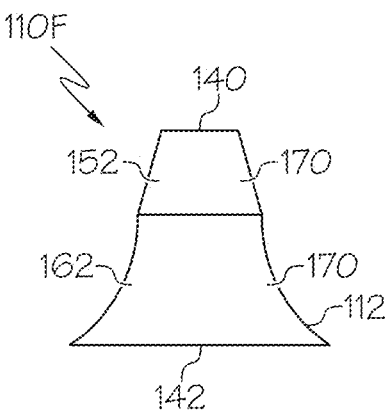
Figure 7G:
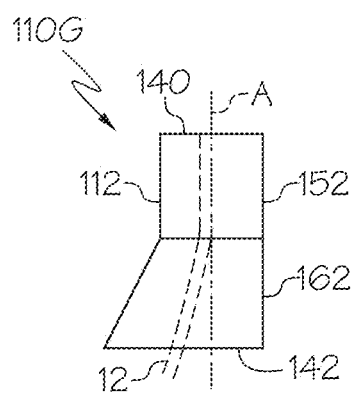

Referring to FIG. 7A, in some embodiments, muffle 110A may include an upper portion 150 for which the upper section 152 the sidewall 112 may be cylindrical in shape and a lower portion 160 for which the lower section 162 of the sidewall 112 may be frustoconical in shape. Referring to FIG. 7B, in some embodiments, muffle 110B may include an upper section 152 and a lower section 162 of the sidewall 112 that are both frustoconical in shape but have different slopes of the inner surface 114 of the sidewall 112. Referring to FIG. 7C, in some embodiments, muffle 110C may have the sidewall 112 that includes the upper section 152, a first lower section 164, and a second lower section 166. In the embodiment of FIG. 7C, the upper section 152, first lower section 164, and second lower section 166 may each be frustoconical in shape with the sidewall 112 in each axial section 170 having a different slope. Referring to FIG. 7D, in some embodiments, muffle 110D may have a sidewall 112 that includes the upper section 152 that is cylindrical and the lower section 162 that is curved outward from the upper section 152. Referring to FIG. 7E, in some embodiments, muffle 110E may include a single axial section 170, and the sidewall 112 may be continuously curved outward from the inlet end 140 to the outlet end 142. Referring to FIG. 7F, in some embodiments, the sidewall 112 of muffle 110F may include the upper section 152 with a frustoconical shape and the lower section 162 with a curved shape. Alternatively, in some embodiments, the upper section 152 may be curved and the lower section 162 may be frustoconical. Referring to FIG. 7G, in some embodiments, the lower section 162 of the sidewall 112 may be asymmetrical relative to the center axis A of the muffle 110 to provide a more consistent distance from the glass tubing 12 catenary to the sidewall 112 in the lower section 162 of the sidewall 112, compared to a symmetrical sidewall.

Referring again to FIG. 5, in some embodiments, the upper section 152 of the sidewall 112 may define the upper portion 150 of the muffle 110 proximate the inlet end 140, and the lower section 162 of the sidewall 112 may extend from the upper section 152 of the sidewall 112 to the outlet end 142. The lower section 162 may define the lower portion 160 of the muffle 110 proximate the outlet end 142. The inner dimension of the lower section 162 of the sidewall 112 may increase from the upper section 152 of the sidewall 112 to the outlet end 142. In some embodiments, the lower section 162 of the sidewall 112 may be frustoconical or curved. In some embodiments, the upper section 152 of the sidewall 112 may be cylindrical.

Referring still to FIG. 5, as previously discussed, the muffle 110 may include the channel 130 located between the outer surface 116 of at least a portion of the sidewall 112 and the insulating layer 126 disposed about the sidewall 112. In some embodiments, the channel 130 may be at least partially defined by the outer surface 116 of the sidewall 112. The channel 130 may be operable to provide cooling to at least a portion of the sidewall 112. For example, the channel 130 may be operable to pass a heat transfer fluid into thermal communication with the sidewall 112 to control a temperature of at least a portion of the inner surface 114 of the sidewall 112.

Figure 8:
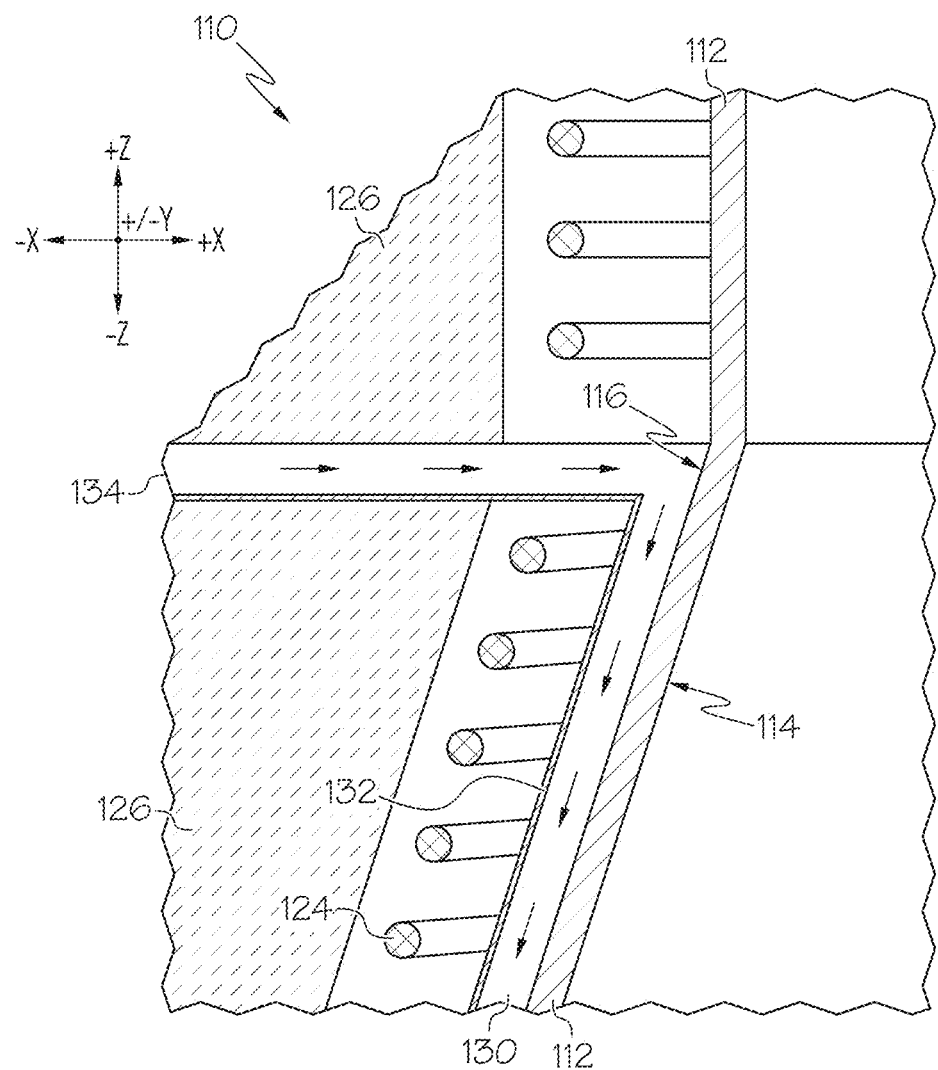
FIG. 8. Schematically depicts a cross-sectional view of a section of the lower portion of the muffle of FIG. 4 in which a channel may be disposed between the sidewall and the channel sidewall, according to one or more embodiments shown and described herein.

In some embodiments, the channel 130 may be an annular space defined between the outer surface 116 of the sidewall 112 on one side and the insulating layer 126 on the other side. Referring to FIG. 8, in some embodiments, the muffle 110 may include a channel sidewall 132 spaced apart from and positioned radially outward from the sidewall 112 of the muffle 110, and the channel 130 may be defined between the outer surface 116 of the sidewall 112 and an inner surface of the channel sidewall 132. In some embodiments, the channel sidewall 132 may be disposed between the sidewall 112 of the muffle 110 and the insulating layer 126 surrounding the sidewall 112. In some embodiments, the channel sidewall 132 may be positioned between the sidewall 112 and the heating elements 124 disposed about the sidewall 112.

Referring again to FIG. 5, the muffle 110 may include a channel inlet 134 and a channel outlet 136, which may both be in fluid communication with the channel 130. The channel inlet 134 may be in fluid communication with a source of a heat transfer fluid, such as a heat exchanger, water/steam source, air, or other source of heat transfer fluid. The heat transfer fluid may include liquid or gaseous heat transfer fluids. The channel inlet 134 may be operable to introduce a heat transfer fluid to the channel 130. The channel outlet 136 may be operable to remove the heat transfer fluid from the channel 130. The channel 130 may be fluidly coupled to a heat exchanger (not shown), and the heat transfer fluid may be circulated through the heat exchanger and continuously reintroduced to the channel inlet 134. For example, in some embodiments, the channel outlet 136 may be fluidly coupled to the inlet of a heat exchanger (not shown) and the channel inlet 134 may be coupled to an outlet of the heat exchanger so that heat can be removed from the heat transfer fluid by the heat exchanger and the heat transfer fluid can be continuously reintroduced to the channel 130. In other embodiments, air or water may be passed through the channel 130 without circulating the air or water through a heat exchanger.

The channel inlet 134 may be in fluid communication with the channel 130 proximate one axial end of the channel 130, and the channel outlet 136 may be in fluid communication with the channel 130 proximate the other axial end of the channel 130. In some embodiments, the channel inlet 134 and the channel outlet 136 may be positioned to produce a flow of heat transfer fluid through the channel 130 that is co-current with the flow of the glass tubing 12 through the muffle 110. For example, in some embodiments, the channel inlet 134 may be positioned more proximate the inlet end 140 of the muffle 110 relative to the channel outlet 136. Alternatively, in other embodiments, the channel inlet 134 and the channel outlet 136 may be positioned to introduce a flow of heat transfer fluid in the channel 130 that is countercurrent to the flow of the glass tubing 12 through the muffle 110. For example, in some embodiments, the channel inlet 134 may be positioned proximate the outlet end 142 of the muffle 110, and the channel outlet 136 may be positioned at the axial end of the channel 130 more proximate the inlet end 140 of the muffle 110.

FIG. 5 illustrates an embodiment in which the channel 130 is positioned in the lower portion 160 of the muffle 110 and the channel inlet 134 and channel outlet 136 are positioned to establish a flow of heat transfer fluid co-current with the flow of the glass tubing 12 through the muffle 110. Referring now to FIG. 8, during operation of the muffle 110, heat transfer fluid may be continuously introduced to the channel inlet 134. The heat transfer fluid may flow through the channel inlet 134 to the channel 130, and then through the channel 130 as indicated by the arrows in FIG. 8. The heat transfer fluid may then pass out of the channel 130 into the channel outlet 136 (FIG. 5), by which the heat transfer fluid is removed from the channel 130. Referring to FIG. 8, while flowing through the channel 130, the heat transfer fluid may be in thermal communication with the outer surface 116 of the sidewall 112.

The heat transfer fluid introduced to the channel inlet 134 may have a temperature less than the temperature of the sidewall 112. The heat transfer fluid may be a heat transfer fluid having a high heat capacity, such as but not limited to water, glycols such as propylene glycol, or other heat transfer fluids. In other embodiments, the heat transfer fluid may be air or other gases. When the heat transfer fluid passes through the channel 130, heat may be transferred from the outer surface 116 of the sidewall 112 into the heat transfer fluid. This heat transfer from the sidewall 112 to the heat transfer fluid may reduce the temperature of the inner surface 114 of the sidewall 112. The decreased temperature of the inner surface 114 of the sidewall 112 may produce a greater temperature gradient between the glass tubing 12 and the inner surface 114 of the sidewall 112 within the muffle 110. This increase in temperature gradient within the muffle 110 may result in a further increase in the heat transfer rate away from the glass tubing 12 in the muffle 110, thereby enabling the muffle 110 to reduce the temperature of the glass tubing 12 to the landing temperature $L_T$ at greater glass flow rates.

Figure 13A:
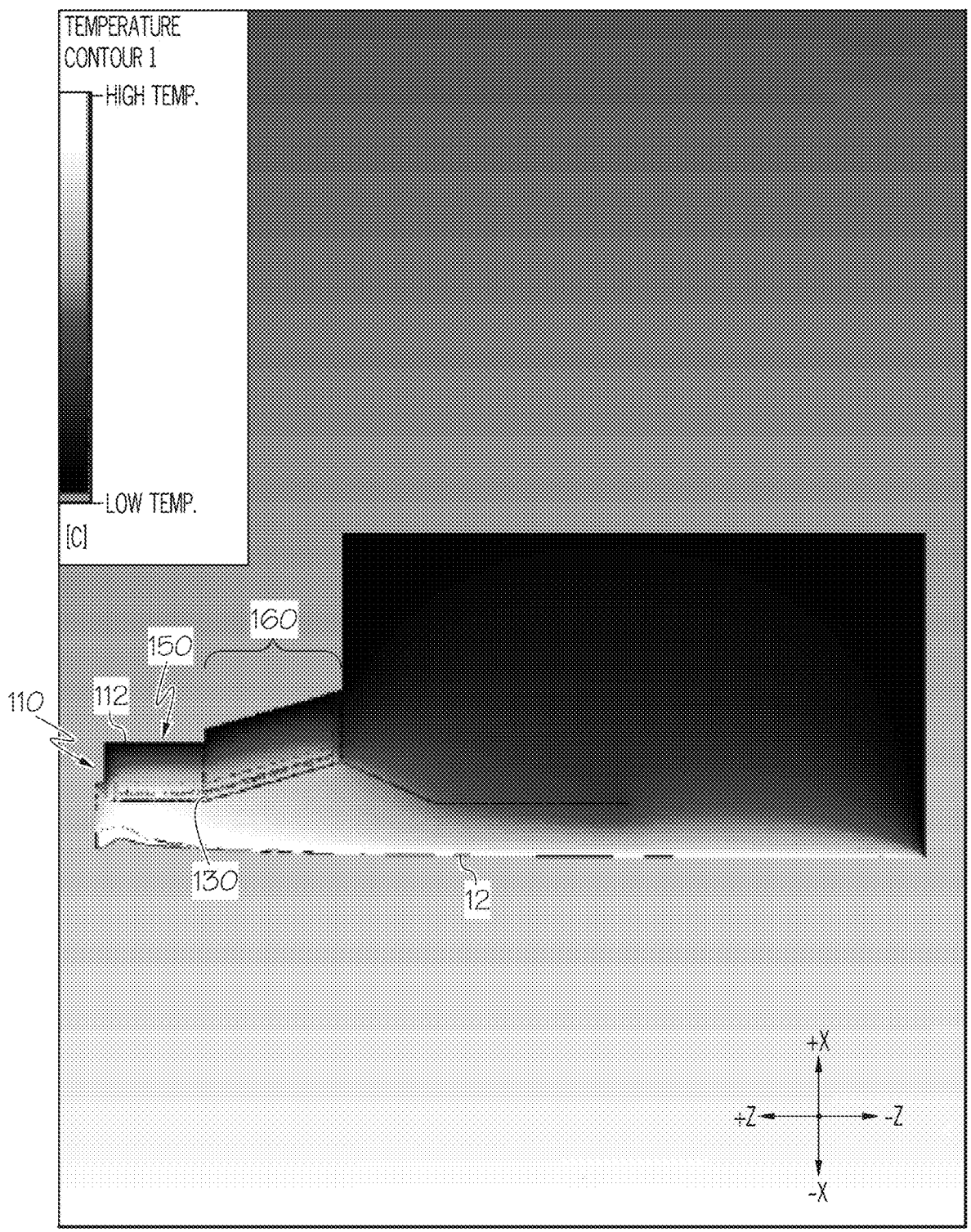
FIG. 13A graphically depicts mathematical modeling of temperature inside a muffle without cooling, according to one or more embodiments shown and described herein.
Figure 13B:
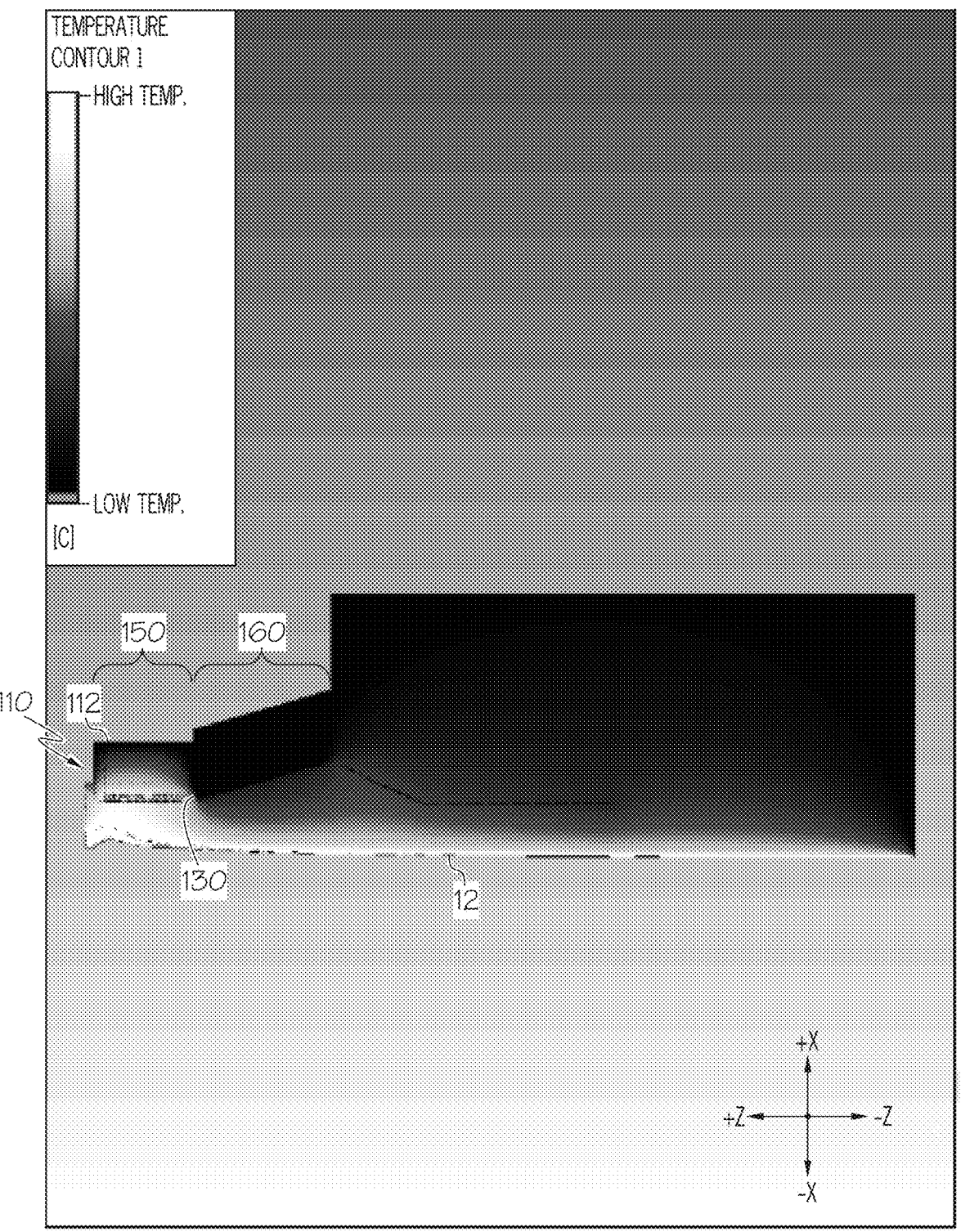
FIG. 13B graphically depicts mathematical modeling of temperature inside the muffle of FIG. 13A with cooling comprising passing air through the channel 130 in a lower portion of the muffle, according to one or more embodiments shown and described herein.

Referring to FIGS. 13A and 13B, mathematical modeling of the temperature within the muffle 110 with and without passive cooling in the lower portion 160 of the muffle 110 indicates that passive cooling can have a substantial impact on the temperature within the muffle. In FIGS. 13A and 13B, the lighter shading corresponds to greater temperatures while the darker shading indicates lesser temperature. In FIG. 13A, results of temperature modeling in the muffle 110 without cooling is presented. As shown in FIG. 13A, without cooling, the entire cavity within the muffle 110 may be at a greater temperature with only a small temperature gradient between the temperature of the glass tubing 12 and the temperature of the inner surface 114 of the sidewall 112.

Referring to FIG. 13B, mathematical modeling of temperature in the muffle 110 operated with passive cooling in the lower portion 160 of the muffle 110 is presented. For the modeling in FIG. 13B, passive cooling was provided by passing air at ambient temperature through the channel 130 in the lower portion 160 of the muffle 110. As shown in FIG. 13B, the cooling provided by passing air through the channel 130 provides a substantial reduction in the temperature profile within the muffle 110, as indicated by the darker shading along the sidewall 112 and within the muffle 110 compared to the shading in the muffle 110 in FIG. 13A. Additionally, FIG. 13B shows a greater temperature gradient between the glass tubing 12 and the inner surface 114 of the sidewall 112 for the muffle 110 operated with passive cooling compared to operation of the muffle 110 without cooling depicted in FIG. 13A.

Figure 14:
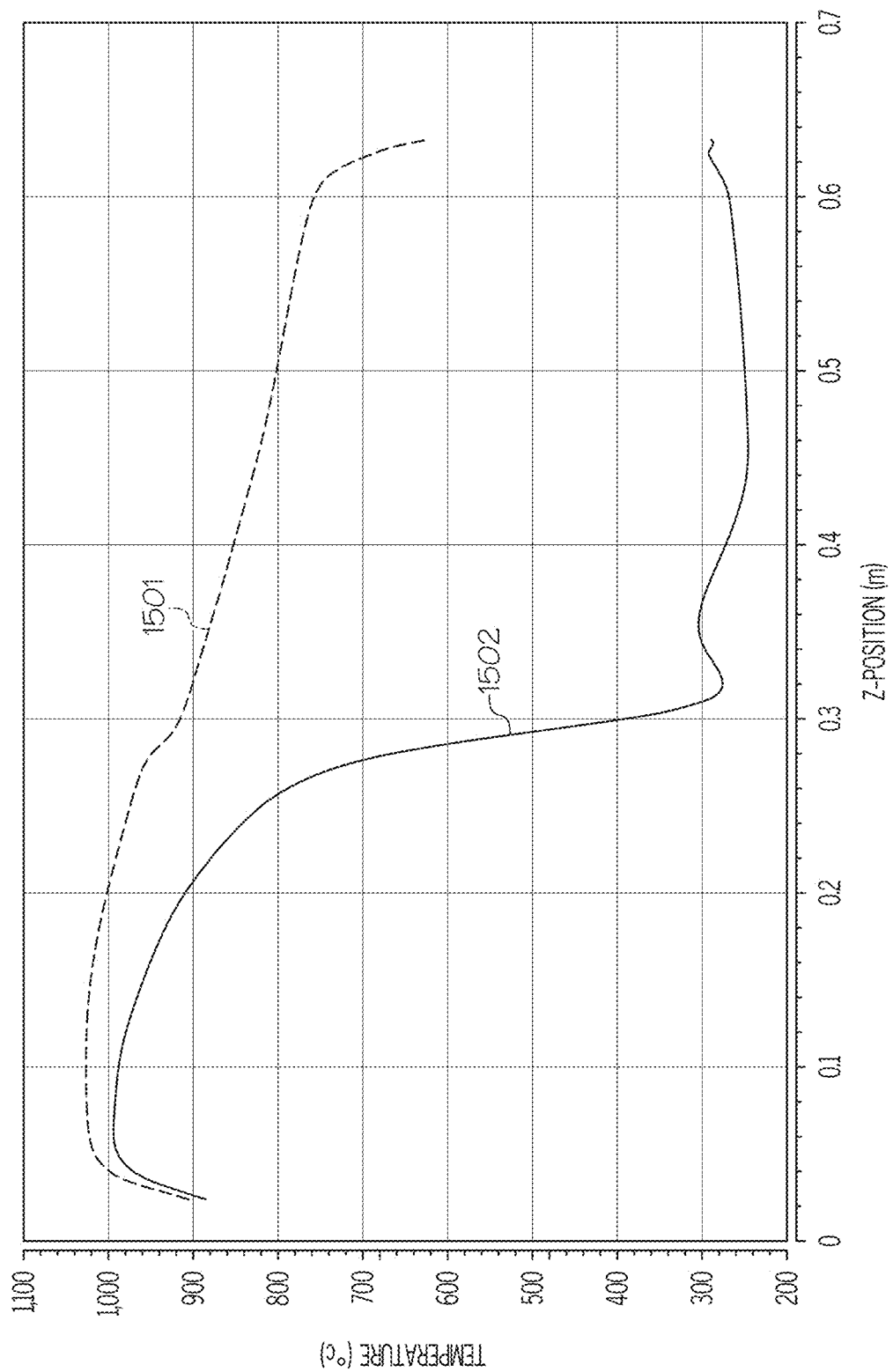
FIG. 14 graphically depicts the surface temperature (y-axis) of the inner surface the muffle as a function of axial position (x-axis) in the muffle, according to one or more embodiments shown and described herein.

FIG. 14 provides mathematical modeling data on the temperature of the inner surface 114 of the muffle 110 as a function of axial position (e.g., Z-position or distance in the −Z direction of the coordinate axis in FIGS. 13A and 13B from the inlet end 140 of the muffle 10) for the systems modeled in FIGS. 13A and 13B. In FIG. 14, the zero on the x-axis corresponds to the inlet end 140 (FIG. 4) of the muffle 110 and the transition between the upper portion 150 and lower portion 160 of the muffle 110 occurs at about 0.3 meters. Data series 1501 corresponds to the temperature profile of the inner surface 114 of the muffle 110 for operation of the muffle 110 with no cooling, such as the muffle 110 modeled in FIG. 13A. Data series 1502 corresponds to the temperature profile of the inner surface 114 of the muffle 110 for operation with passive cooling in the lower portion 160 of the muffle 110. As demonstrated by FIG. 5, cooling of the sidewall 112 in the lower portion 160 of the muffle 110 can reduce the temperature of the inner surface 114 of the sidewall 112 by 500° C. or more down to a temperature less than 300° C. This produces a greater temperature gradient in the muffle 110 between the glass tubing 12 and the inner surface 114 of the sidewall 112, which may greatly increase the heat transfer rate away from the glass tubing 12 as it passes through the muffle 110.

By increasing the temperature gradient between the inner surface 114 of the sidewall 112 and the glass tubing 12, the muffle 110 disclosed herein may provide passive cooling of the glass tubing 12 that is indirect, meaning that the heat transfer fluid does not come into contact with the surface of the glass tubing 12, as would be the case with active cooling by introducing a heat transfer fluid such as air directly into the muffle 110 cavity. Thus, the muffle 110 disclosed herein provides passive cooling to the glass tubing 12 without impacting or physically contacting the outer surface of the glass tubing 12. The temperature gradient within the muffle 110, and thus the heat transfer rate away from the glass tubing 12, may be increased or decreased by changing the flow rate, temperature, or heat capacity of the heat transfer fluid introduced to the channel 130. The heat capacity can be modified through selection of the specific heat transfer fluid.

In some embodiments, the channel 130 may include a single channel inlet 134 and a single channel outlet 136. In other embodiments, the channel 130 may have a plurality of channel inlets 134 such as 2, 3, 4, 5, 6, or more than 6 channel inlets 134. The plurality of channel inlets 134 may be distributed radially about the channel 130. In some embodiments, the channel 130 may include a plurality of channel outlets 136 such as 2, 3, 4, 5, 6, or more than 6 channel outlets 136. The plurality of channel outlets 136 may be distributed radially about the channel 130.

Figure 9:
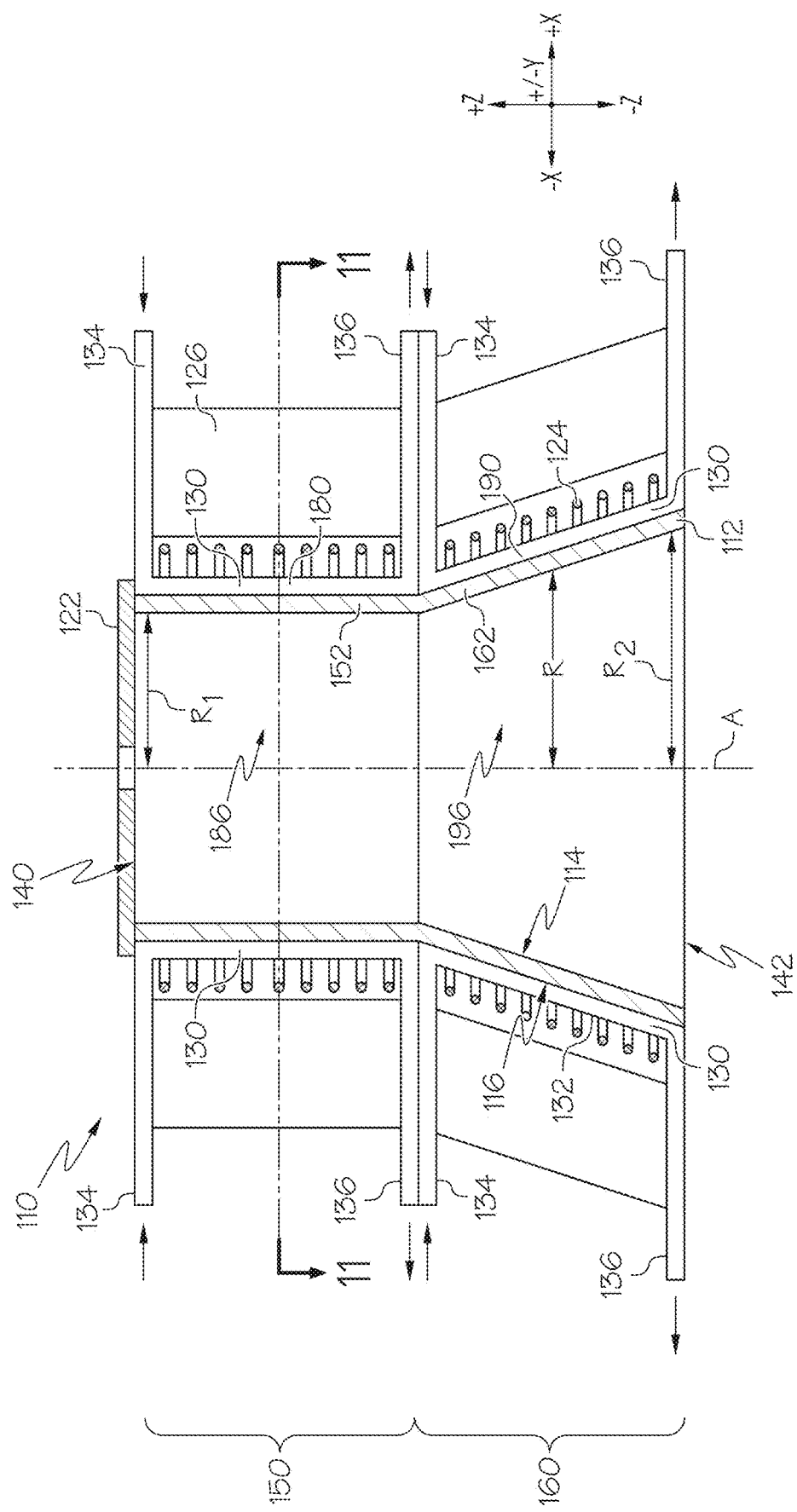
FIG. 9 schematically depicts a cross-sectional view of another embodiment of a muffle for the process of FIG. 4, according to one or more embodiments shown and described herein.

Referring to FIG. 9, in some embodiments, the muffle 110 may include a plurality of channels 130 fluidly isolated from one another. The plurality of channels 130 may be separated from each other and positioned at different locations of the muffle 110. In some embodiments, the plurality of channels 130 may be annular channels and may be distributed axially (i.e., in the +/−Z direction of the coordinate axis of FIG. 10) along the muffle 110. For example, in some embodiments, the muffle 110 may include an upper channel 180 and a lower channel 190. The upper channel 180 may be positioned between an outer surface of the upper section 152 of the sidewall 112 and the insulating layer 126 so that the upper channel 180 can provide cooling to the upper portion 150 of the muffle 110. The lower channel 190 may be positioned between an outer surface of the lower section 162 of the sidewall 112 and the insulating layer 126 so that the lower channel 190 can provide cooling to the lower portion 160 of the muffle 110. The upper channel 180 and the lower channel 190 may be fluidly isolated from each other with the upper channel 180 positioned proximate the inlet end 140 of the muffle 110 relative to the lower channel 190. The upper channel 180 and the lower channel 190 may each include at least one channel inlet 134 and at least one channel outlet 136. The upper channel 180 and the lower channel 190 may be operated independently to fine tune the heat transfer rate in the upper portion 150 and lower portion 160 of the muffle 110, respectively.

The muffle 110 may include a plurality of upper channels 180 and/or a plurality of lower channels 190. For example, in some embodiments, the muffle 110 may include the upper channel 180 and a plurality of lower channels 190; a plurality of upper channels 180 and a single lower channel 190; or a plurality of upper channels 180 and a plurality of lower channels 190. Each of the plurality of upper channels 180 and/or plurality of lower channels 190 may be fluidly isolated from each other and may each include at least one channel inlet 134 and at least one channel outlet 136. The plurality of upper channels 180 and/or the plurality of lower channels 190 may enable finer tuning of the temperature profile within the muffle 110 compared to a muffle 110 having a single upper channel 180 and a single lower channel 190.

Figure 10:
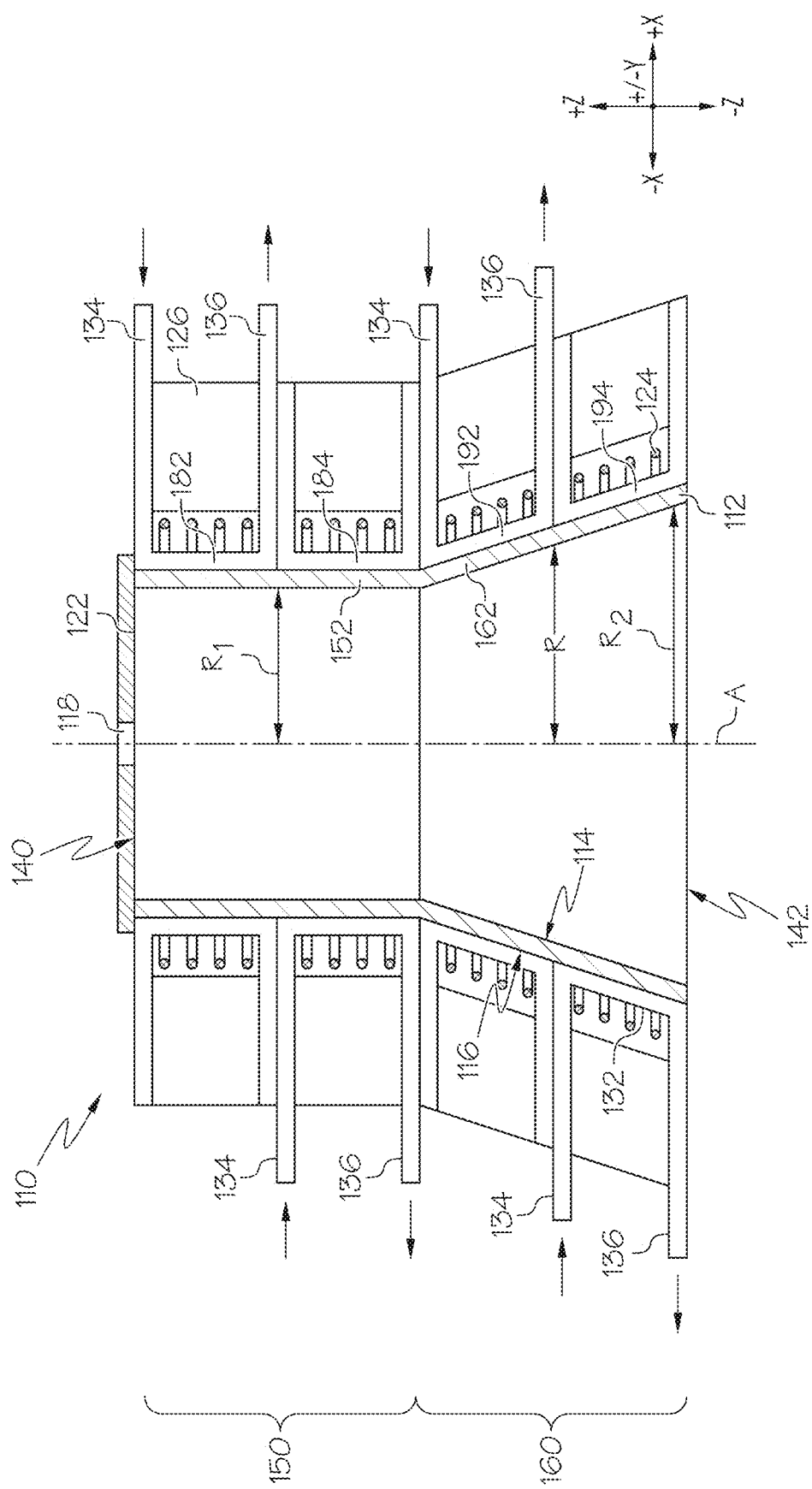
FIG. 10 schematically depicts a cross-sectional view of yet another embodiment of a muffle for the process of FIG. 4, according to one or more embodiments shown and described herein.

Referring to FIG. 10, in some embodiments, the muffle 110 may include a first upper channel 182 and a second upper channel 184. The first upper channel 182 may be positioned proximate the inlet end 140 of the muffle 110, and the second upper channel 184 may be positioned vertically below (i.e., in the −Z direction of the coordinate axis of FIG. 10) the first upper channel 182. The muffle 110 may also include a first lower channel 192 and a second lower channel 194. The second lower channel 194 may be positioned proximate the outlet end 142 of the muffle 110, and the first lower channel 192 may be positioned vertically above (i.e., in the +Z direction of the coordinate axis of FIG. 10) the second lower channel 194.

In some embodiments, the muffle may include one or more channels 130 that include a plurality of angular channel segments fluidly isolated from each other and distributed angularly about the outer surface 116 of the sidewall 112.

Figure 11:
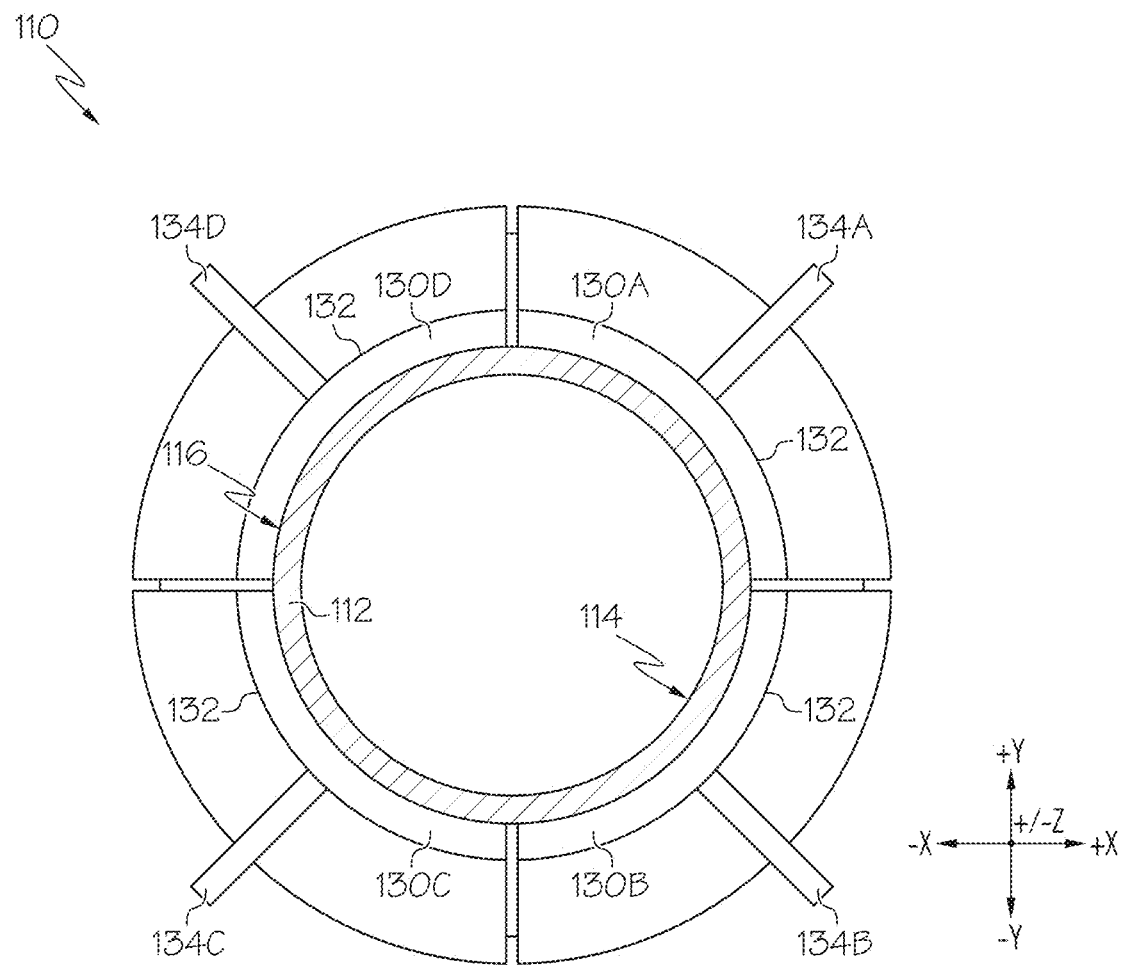
FIG. 11 schematically depicts a cross-sectional view of the muffle of FIG. 9 taken along reference line 11-11 in FIG. 9, according to one or more embodiments shown and described herein.

The channel 130 may include 2 or more than 2 angular channel segments, such as 2, 3, 4, 5, 6, 7, 8, or more than 8 angular channel segments. For example, referring to FIG. 11, a cross-section of the muffle 110 having a plurality of angular channel segments 130A-130D is depicted. In FIG. 11, the cross-section of the muffle 110 is taken relative to a transverse plane (i.e., a plane parallel to the X-Y plane of the coordinate axis of FIG. 11 which is indicated in FIG. 9 by reference line 11-11) passing through the muffle 110. In some embodiments, the muffle 110 may include a first angular channel segment 130A, a second angular channel segment 130B, a third angular channel segment 130C, and a fourth angular channel segment 130D. The plurality of angular channel segments 130A, 130B, 130C, and 130D may enable fine tuning of the temperature profile relative to angular position within the muffle 110. Although shown with four angular channel segments in FIG. 11, it is understood that the muffle 110 may comprise less than or greater than 4 angular channel segments. In some embodiments, the channel 130 may be divided into a plurality of axial channel segments and a plurality of angular channel segments. In embodiments having a plurality of channels 130, each of the channels 130 may have one or a plurality of channel inlets 134, such as 1, 2, 3, 4, 5, 6, or more than 6 channel inlets 134. Each of the channels 130 may also include one or a plurality of channel outlets 136, such as 1, 2, 3, 4, 5, 6, or more than 6 channel outlets 136.

The presence of a plurality of channels 130 disposed at various axial and/or radial positions within the muffle 110 may form a plurality of heat transfer zones within the muffle 110. For example, referring again to FIG. 9, the upper channel 180 and the lower channel 190 may segregate the muffle 110 into an upper heat transfer zone 186 (e.g., corresponding to the cavity in the upper portion 150 of the muffle 110), in which heat transfer may be controlled by the upper channel 180, and a lower heat transfer zone 196 (e.g., corresponding to the cavity in the lower portion 160 of the muffle 110), in which heat transfer may be controlled by the lower channel 190. The upper channel 180 and the lower channel 190 may be independently operated with respect to heat transfer fluid flow rate, pressure, temperature, or other operating parameters, to independently control the heat transfer rate in the upper heat transfer zone 186 and lower heat transfer zone 196, respectively. In embodiments in which the channel 130 comprises a plurality of channels (e.g., FIGS. 9, 10, and 11), each of the plurality of channels may be independently operated to control the heat transfer rate in a plurality of heat transfer zones within the muffle 110.

Referring again to FIG. 4, the insulating layer 126 may include a refractory material, such as but limited to ceramic refractory materials or other refractory materials. In some embodiments, the muffle 110 may additionally include a heating element 124 disposed between the sidewall 112 and the insulating layer 126. The heating element 124 may be in thermal communication with at least a portion of the sidewall 112. The heating element 124 may be a resistance heater such as, but not limited to, a resistance heating wire wound around the muffle 110; a flame heating element such as a gas burner; or other heating device. In some embodiments, the heating element 124 may include at least one resistance heating wire disposed between the channel 130 and the insulating layer 126 surrounding the muffle 110. In some embodiments, the heating element 124 may include a plurality of heating elements. The heating element(s) 124 may be operated in conjunction with the channel 130 to control heat transfer in various portions of the muffle 110.

For example, the heating element 124 may enable the muffle 110 to control the landing temperature $T_L$ of the glass tubing 12 when operating at lesser glass flow rates, such as when producing very small diameter glass tubing or during periods of decreased draw speed, such as during process interruptions (e.g., start-up, shutdown, changing tubing size, off-spec events, or other process interruptions).

Referring to FIG. 4, in some embodiments, the system 100 for producing glass tubing 12 may include the bowl 20, the muffle 110 coupled to the bowl 20, and the tube runway 60 disposed below the muffle 110. As previously described, in some embodiments, the bowl 20 may include at least one cylindrical container 22 having an orifice ring 28 extending from a bottom 24 of the cylindrical container 22. The orifice ring 28 may define an orifice 26 in the bottom 24 of the cylindrical container 22. The bowl 20 may also include the blow tube 30 disposed within the cylindrical container 22 and extending through the orifice 26. The blow tube 30 may be operable to deliver a gas flow proximate the orifice ring 28. The muffle 110 may include the inlet end 140 coupled to the bowl 20 and the outlet end 142 having an inner dimension greater than an inner dimension of the inlet end 140. The muffle 110 may further include the sidewall 112 extending from the inlet end 140 to the outlet end 142. The radial distance R from a center axis A of the muffle 110 to the inner surface 114 of the sidewall 112 may increases from the inlet end 140 to the outlet end 142. The inner surface 114 of the sidewall 112 may be substantially free of abrupt changes in the radial distance R from the center axis A to the inner surface 114 that produce instability regions within the muffle 110. The muffle 110 may further include the channel 130 disposed between the outer surface 116 of the sidewall 112 and the insulating layer 126 disposed about the sidewall 112. The channel 130 may be operable to pass a heat transfer fluid into thermal communication with the sidewall 112 to provide cooling to the sidewall 112. The muffle 110 may be operable to control the temperature of the molten glass tubing 12 drawn from the bowl 20, such as by controlling the heat transfer rate away from the glass tubing 12 passing through the muffle 110. The muffle 110 of system 100 may have any of the other features of the muffle 110 described herein. The tube runway 60 may include the diabolos 62 and a heat transfer chamber 64.

Referring still to FIG. 4, in some embodiments, a glass tube forming process may include drawing the glass tubing 12 from a bowl 20 and passing the glass tubing 12 through a muffle 110. The muffle 110 may have any of the features described herein in relation to muffle 110. For example, in some embodiments, the muffle 110 may include the inlet end 140 coupled to the bowl 20 and the outlet end 142 having an inner dimension greater than an inner dimension of the inlet end 140. The muffle 110 may further include the sidewall 112 extending from the inlet end 140 to the outlet end 142. The radial distance R from a center axis A of the muffle 110 to the inner surface 114 of the sidewall 112 may increase from the inlet end 140 to the outlet end 142. The inner surface 114 of the sidewall 112 may be substantially free of abrupt changes in the radial distance R from the center axis A to the inner surface 114 that produce instability regions within the muffle 110. The muffle 110 may further include the channel 130 disposed between the outer surface 116 of the sidewall 112 and the insulating layer 126 disposed about the sidewall 112. The glass tube forming process may further include cooling the glass tubing 12 passing through the muffle 110. Cooling the glass tubing 12 may include passing a heat transfer fluid through the channel 130 disposed between the outer surface 116 of a portion of the sidewall 112 and the insulating layer 126 disposed about the sidewall 112. The channel 130 may be in thermal communication with the sidewall 112.

In some embodiments, the process may further include passing the glass tubing 12 to the tube runway 60, in which controlled cooling of the glass tubing 12 may be conducted. In some embodiments, the muffle 110 may control the rate of heat transfer away from the glass tubing 12 so that the temperature of the glass tubing 12 reaches the landing temperature $T_L$ at the location 68 where the glass tubing 12 lands on the diabolos 62 of the tube runway 60. In some embodiments, cooling the glass tubing 12 may include controlling a temperature of the glass tubing 12 passing through the muffle 110 by controlling at least one heating element 124 in thermal communication with the outer surface 116 of the sidewall 112.

The glass tubing 12 produced by the system 100 according to the processes described herein may be shaped into glass articles such as bottles, glass containers, etc. The glass tubing 12 produced by the system 100 and processes disclosed herein may be strengthened by thermal or chemical tempering methods to increase the physical and chemical durability of the glass tubing 12 and articles made therefrom. The glass tubing 12 made using the system 100 and processes disclosed herein may be particularly well suited for use in the formation of pharmaceutical packages for containing a pharmaceutical composition, such as liquids, powders and the like. For example, the glass tubing 12 may be used to form vials, ampoules, cartridges, syringe bodies and/or any other glass container for storing pharmaceutical compositions or other compounds.

EXAMPLES

The following examples illustrate the effects of the standard deviation in the temperature of the air in the muffle on the variation in the dimensions of the glass tubing produced. The following prophetic examples were based on experimental measurements in a full scale glass tubing production plant.

Figure 15:
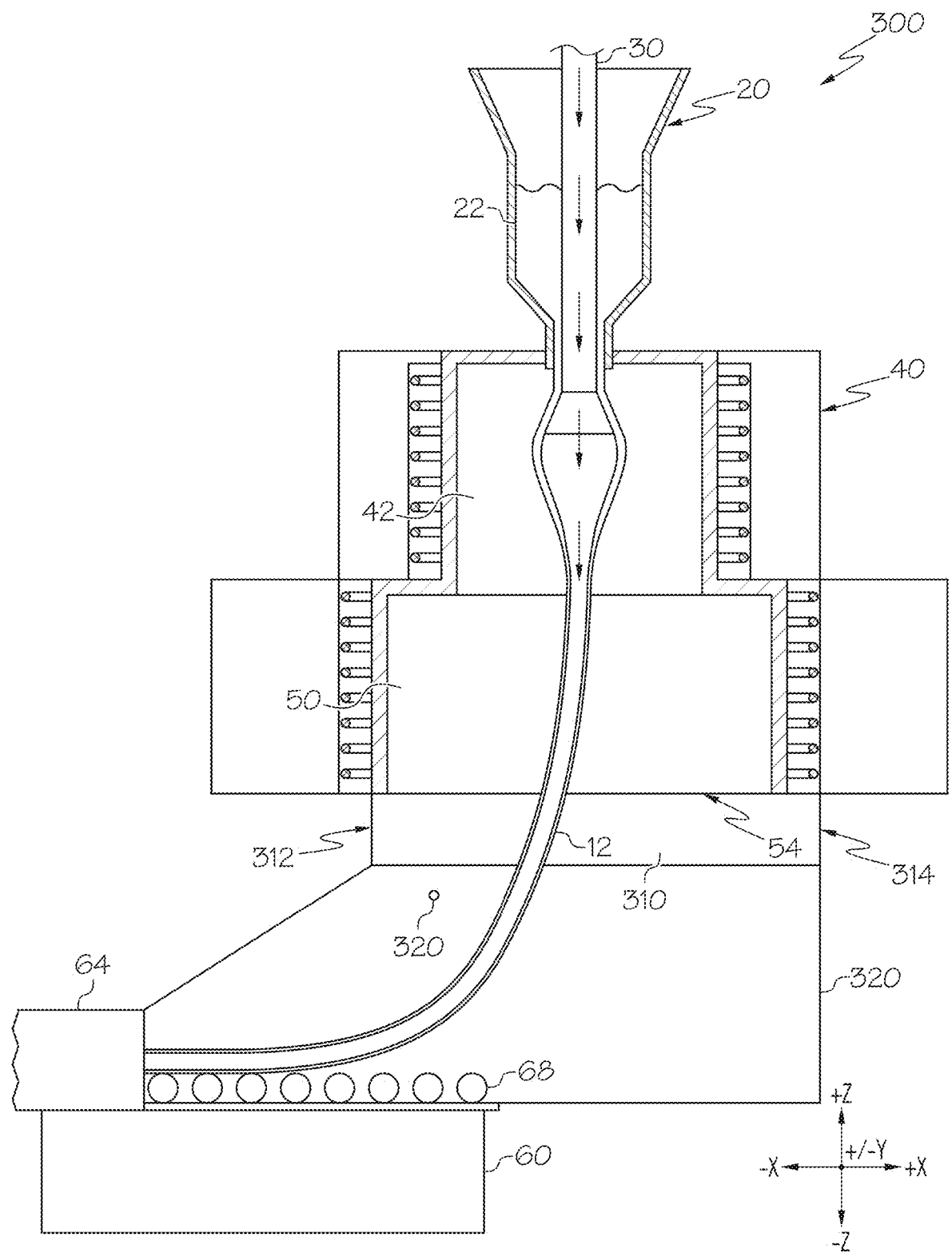
FIG. 15 schematically depicts an experimental system for producing glass tubing modeled to study the effects of the standard deviation in temperature of the glass tubing on the dimensions of the glass tubing, according to one or more embodiments shown and described herein.

Referring to FIG. 15, the effects of the standard deviation in the temperature of the glass tubing 12 on the dimensions of the glass tubing 12 were studied using the Vello system 300 schematically depicted in FIG. 15. The Vello system 300 included the bowl 20, the blow tube 30, the conventional muffle 40, a base enclosure 310, and a tube runway 60. Optionally, the Vello process 300 also included a high temperature shroud 320. The bowl 20 included the cylindrical container 22 and the orifice ring 28. The effects of the standard deviation in temperature of the glass tubing 12 were modeled based on the conventional muffle 40 that included the first portion 42 proximate the orifice ring 28 and a second portion 50 coupled to the first portion 42, wherein the first portion 42 and second portion 50 were both cylindrical in shape.

The base enclosure 310 was a rigid enclosure coupled to the second portion 50 of the muffle 40 proximate the outlet 54 and extending downward (i.e., in the −Z direction of the coordinate axis of FIG. 15) from the second portion 50 to further enclose the glass tubing 12. The base enclosure 310 had the shape of a truncated square pyramid with the large end coupled to the muffle 40 and the smaller end oriented downward (i.e., in the −Z direction of the coordinate axis of FIG. 15). The base enclosure 310 included a front panel 312 facing in the direction of the tube runway 60 (i.e., in the −X direction of the coordinate axis in FIG. 15) and a back panel 314 facing away from the front panel 312 and away from the tube runway 60 (i.e., in the +X direction of the coordinate axis in FIG. 15). In some examples, the Vello system 300 optionally included the high temperature shroud 320 extending from the base enclosure 310 to the tube runway 64 to completely enclose the glass tubing 12 between the bowl 20 and the tube runway 60. The high temperature shroud 320 may be a high temperature fabric such as high temperature silk cloth capable of withstanding temperatures up to and/or exceeding the temperatures of the glass tubing 12 in the muffle 40. The modeling in the following examples is based on production of glass tubing 12 having an outside diameter of 10.95 mm.

Example 1

In Example 1, the variation in dimensions of the glass tubing as a function of standard deviation in temperature of the air in the muffle was modeled based on the Vello system 300 of FIG. 15 with the base enclosure 310 but without the high temperature shroud 320. The temperature and velocity of the air was measured at a point 320, which was about 1 to 2 inches above the glass tubing 12 and about 8 inches in from the front panel 312 of the base enclosure 310. For Example 1, the average velocity of the air was 1.745 m/s and the average temperature of the air was 372.95° C.

Example 2

In Example 2, the standard deviation in the temperature of the air in the muffle was reduced by including the high temperature shroud 320 to fully enclose the glass tubing between the base enclosure 310 an the tube runway 60 and increase isolation of the air in the muffle from ambient conditions. The modeling in Example 2 was based on the Vello system 300 of FIG. 15 with the base enclosure 310 and the high temperature shroud 320. The high temperature shroud 310 fully enclosed the glass tubing to reduce the effects of the ambient air on the temperature and velocity of air within the muffle. The average velocity of the air in the muffle was 1.715 m/s, and the average temperature of the air in the muffle was 440.31° C. The increase in temperature of the air in Example 2 relative to Example 1 is expected due to fully enclosing the air and glass tube between the muffle 40 and the tube runway 60.

Example 3

In Example 3, the standard deviation in the temperature of the air in the muffle was increased relative to Example 2 by introducing ambient air to the glass tubing through an opening in the back panel 314 of the base enclosure 310. The modeling in Example 3 was based on the Vello system 300 of FIG. 15 with the base enclosure 310 and the high temperature shroud 320. In Example 3, a gap having a width of 1.75 inches (44.45 mm) was placed in the back panel 314 of the base enclosure 310 to allow ambient air into the inner cavity formed by the base enclosure 310. For Example 2, the average velocity of the air in the muffle was 1.647 m/s, and the average temperature of the air was 388.18° C. The decrease in temperature of the air in the muffle for Example 3 relative to Example 2 may be due to reintroduction of ambient air to the cavity of the base enclosure 310.

Example 4

In Example 4, the standard deviation in the temperature of the air in the muffle was dramatically increased relative to Examples 1 through 3 by introducing ambient air to the base enclosure 310 through an opening in the front panel 312 and an opening in the back panel 314 of the base enclosure 310. The modeling in Example 4 was based on the Vello system 300 of FIG. 15 with the base enclosure 310 and the high temperature shroud 320. In Example 4, gaps having widths of 1.75 inches (44.45 mm) were placed in the front panel 312 and back panel 314 of the base enclosure 310 to allow ambient air into the inner cavity of the base enclosure 310 from two directions. For Example 4, the average velocity of the air in the muffle was 2.438 m/s, and the average temperature of the air was 332.90° C. The average temperature of the air in the muffle in Example 4 decreased relative to Examples 1 and 3.

Example 5

In Example 5, the standard deviation in the temperature of the air in the muffle was further modified by widening the gaps in the front panel 312 and back panel 314 of the base enclosure 310. The modeling in Example 5 was based on the Vello system 300 of FIG. 15 with the base enclosure 310 and the high temperature shroud 320. In Example 5, the gaps in the front panel 312 and back panel 314 were widened to a width of 5.0 inches (127 mm) to allow ambient air into the inner cavity formed by the base enclosure 310. For Example 5, the average velocity of the air in the muffle was 2.800 m/s, and the average temperature of the air was 247.85° C. The average temperature of the air in the muffle in Example 5 decreased relative to Examples 4 due to the greater volume of ambient air permitted to flow into the cavity.

Example 6

In Example 6, the standard deviation in the temperature of the air in the muffle was further modified by eliminating the gap in the back panel 314 and allowing ambient air to only enter the cavity through the gap in the front panel 312. The modeling in Example 6 was based on the Vello system 300 of FIG. 15 with the base enclosure 310 and the high temperature shroud 320. In Example 5, the base enclosure included only a gap of 1.75 inches (44.45 mm) in the front panel 312 with no gap in the back panel 314. For Example 6, the average velocity of the air in the muffle was 1.699 m/s, and the average temperature of the air was 377.578° C. The average temperature of the air in the muffle in Example 6 increased relative to Examples 4 and 5 due to the reduced volume of ambient air permitted to flow into the cavity.

Example 7: Comparison of Examples 1 Through 6

In Example 7, the temperature standard deviation of the air in the muffle and variability in the dimensions for the glass tubing of Examples 1 through 6 were compared to evaluate the effects of the standard deviation in the temperature of the air in the muffle on the dimensions of the glass tubing. For each of Examples 1 through 6, the taper and outside diameter of the glass tubing and the temperature and velocity of the air in the muffle were measured. The average (AVE) and standard deviation (STD) for each of the taper of the glass tubing, outside diameter (OD) range of the glass tubing, air temperature (T), and air velocity (V) for Examples 1 through 6 are provided below in Table 1. As used herein, the term "taper" refers to the different in the OD from one end of the glass tubing over the entire length of the tubing to the other end. The taper of glass tubing is generally less than about one half of the total OD tolerance.

TABLE 1

Figure 16:
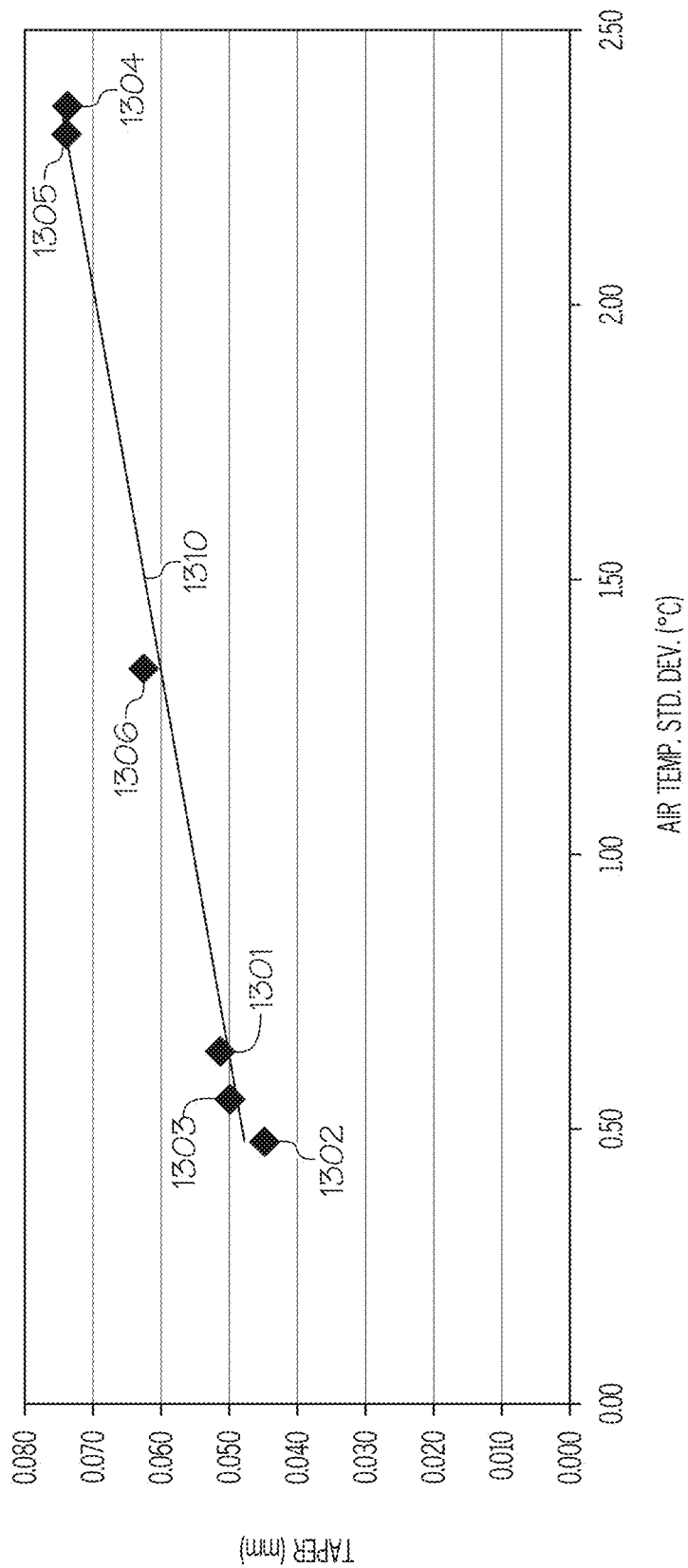
FIG. 16 graphically depicts the taper (y-axis) of glass tubing as a function of the standard deviation in the air temperature (x-axis) in the muffle, according to one or more embodiments shown and described herein.

| Configuration, Operating Conditions, and Glass Tubing Properties for Examples 1 through 6 | | | | | | |
|---|---|---|---|---|---|---|
| | Ex. 1 | Ex. 2 | Ex. 3 | Ex. 4 | Ex. 5 | Ex. 6 |
| Ref. no in FIG. 16 | 1301 | 1302 | 1303 | 1304 | 1305 | 1306 |
| Base Enclosure | Y | Y | Y | Y | Y | Y |
| Shroud | N | Y | Y | Y | Y | Y |
| Front Gap (in) | — | — | — | 1.75 | 5.0 | 1.75 |
| Back Gap (in) | — | — | 1.75 | 1.75 | 5.0 | — |
| Taper Ave (mm) | 0.051 | 0.045 | 0.050 | 0.074 | 0.074 | 0.062 |
| Taper STD (mm) | 0.018 | 0.019 | 0.016 | 0.023 | 0.026 | 0.019 |
| OD Range Ave (mm) | 0.080 | 0.073 | 0.080 | 0.106 | 0.102 | 0.098 |
| OD Range STD (mm) | 0.019 | 0.016 | 0.016 | 0.022 | 0.026 | 0.019 |
| V - Ave (m/s) | 1.745 | 1.715 | 1.647 | 2.438 | 2.800 | 1.699 |
| V - STD (m/s) | 0.175 | 0.092 | 0.127 | 0.378 | 0.356 | 0.258 |
| T - Ave (° C.) | 371.95 | 440.31 | 388.82 | 332.90 | 247.85 | 377.58 |
| T - STD (° C.) | 0.642 | 0.475 | 0.554 | 2.362 | 2.311 | 1.338 |

As shown in Table 1, increasing the standard deviation in the temperature of the air in the muffle as in Examples 4 and 5 result in an increase in the variability in the dimensions of the glass tubing, as shown by the increase in the standard deviation of the taper and OD of the glass tubing of Examples 4 and 5 relative to Examples 1-3. Referring to FIG. 16, the standard deviation of the taper of the glass tubing from Table 1 is graphically depicted as a function of the standard deviation in the air temperature in the muffle. Trendline 1310 was fit to the data depicted in FIG. 16 and had an $R^2$ value of 0.9769, showing a high confidence level in the fit of trendline 1310 to the data. As shown in FIG. 16, the variation in dimensions of the glass tubing (e.g., taper) may be linearly dependent upon the variation in the air temperature in the muffle (i.e., standard deviation of the air temperature). Thus, the comparison in Example 7 of Examples 1 through 6 demonstrates that improving temperature control of the air in the muffle can decrease the variability in the dimensions and shape of the glass tubing.

While various embodiments of the muffle 110, system 100 incorporating the muffle 110, and glass tube forming processes have been described herein, it should be understood that it is contemplated that each of these embodiments and techniques may be used separately or in conjunction with one or more embodiments and techniques. It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A muffle for a glass tube forming process, the muffle comprising:
   an inlet end coupled to a bowl for producing glass tubing;
   an outlet end, wherein an inner dimension of the muffle at the outlet end is greater than an inner dimension of the muffle at the inlet end;
   a sidewall extending from the inlet end to the outlet end, wherein a radial distance from a center axis of the muffle to an inner surface of the sidewall increases from the inlet end to the outlet end and the sidewall is substantially free of abrupt changes in the radial distance from the center axis to the inner surface; and
   a channel positioned between an outer surface of at least a portion of the sidewall and an insulating layer disposed about the sidewall, the channel operable to pass a heat transfer fluid into thermal communication with the sidewall to control a temperature of at least a portion of the inner surface of the sidewall.

2. The muffle of claim 1, wherein changes in the radial distance from the center axis to the inner surface of the muffle per centimeter of axial length of the muffle have an absolute value less than 0.635 cm at all positions on the inner surface of the sidewall between the inlet end and the outlet end.

3. The muffle of claim 1, wherein a slope of a plot of radial distance from the center axis of the muffle to the inner surface of the sidewall as a function of axial position has an absolute value less than or equal to 2 along the axial length of the muffle between the inlet end and the outlet end, wherein the slope of the plot of radial distance as a function of axial position is determined as an average slope over a change in axial position of at least 0.25 inches (0.635 cm).

4. The muffle of claim 1, wherein the inner surface of the sidewall is free of step changes in the radial distance from the center axis of the muffle to the inner surface of the sidewall of greater than 0.25 inches (0.635 cm).

5. The muffle of claim 1, wherein at least a portion of the sidewall is frustoconical or bell-shaped.

6. The muffle of claim 1, wherein the channel comprises a channel inlet and a channel outlet.

7. The muffle of claim 6, wherein the channel inlet is proximate the inlet end of the muffle relative to the channel outlet.

8. The muffle of claim 1, wherein the channel comprises a plurality of channels fluidly isolated from each other.

9. The muffle of claim 8, wherein each of the plurality of channels is annular and the plurality of channels are axially arranged.

10. The muffle of claim 8, wherein each of the plurality of channels is oriented longitudinally so that the channel inlet and the channel outlet are axially spaced apart and the plurality of channels are arranged radially around the outer surface of the sidewall.

11. The muffle of claim 1, wherein the channel is fluidly coupled to a heat exchanger.

12. The muffle of claim 1, wherein an upper section of the sidewall defines an upper portion of the muffle proximate the inlet end and a lower section of the sidewall extends from the upper section of the sidewall to the outlet end and defines a lower portion of the muffle proximate the outlet end, wherein a diameter of the lower section of the sidewall increases from the upper section of the sidewall to the outlet end.

13. The muffle of claim 12, wherein the lower section of the sidewall is frustoconical or curved.

14. The muffle of claim 12, wherein the upper section of the sidewall is cylindrical.

15. The muffle of claim 12, wherein the channel comprises at least one lower channel disposed between an outer surface of the lower section of the sidewall and the insulating layer.

16. The muffle of claim 15, wherein the lower channel comprises a plurality of lower channels fluidly isolated from each other.

17. The muffle of claim 12, wherein the channel comprises at least one upper channel disposed between an outer surface of the upper section of the sidewall and the insulating layer.

18. The muffle of claim 1, further comprising at least one heating element in thermal communication with at least a portion of the sidewall.

19. A system for producing glass tubing, the system comprising:
   a bowl comprising:
      at least one cylindrical container having an orifice ring extending from a bottom of the cylindrical container, the orifice ring defining an orifice in the bottom of the cylindrical container; and
      a blow tube disposed within the cylindrical container and extending through the orifice, the blow tube operable to deliver a gas flow proximate the orifice ring; and
   a muffle comprising:
      an inlet end coupled to the bowl;
      an outlet end having an inner dimension larger than an inner dimension of the inlet end;
      a sidewall extending from the inlet end to the outlet end, wherein a radial distance from a center axis of the muffle to an inner surface of the sidewall increases from the inlet end to the outlet end and the inner surface of the sidewall is substantially free of abrupt changes in the radial distance from the center axis to the inner surface; and
      a channel positioned between an outer surface of the sidewall and an insulating layer disposed about the sidewall, the channel operable to pass a heat transfer fluid into thermal communication with the sidewall to provide cooling to the sidewall;
   wherein the muffle is operable to control a temperature of the glass tubing drawn from the bowl.

20. The system of claim 19, further comprising a tube runway disposed below the muffle, the tube runway comprising a plurality of diabolos and a heat transfer zone.

21. The system of claim 19, wherein changes in the radial distance from the center axis to the inner surface of the muffle per centimeter of axial length of the muffle have absolute values less than 0.635 cm at all positions on the inner surface of the sidewall between the inlet end and the outlet end.

22. The system of claim 19, wherein at least a portion of the sidewall is frustoconical or bell-shaped.

23. The system of claim 19, wherein an upper section of the sidewall defines an upper portion of the muffle proximate the inlet end and a lower section of the sidewall extends from the upper section of the sidewall to the outlet end and defines a lower portion of the muffle proximate the outlet end, wherein a diameter of the lower section of the sidewall increases from the upper section of the sidewall to the outlet end.

24. The system of claim 19, wherein the channel comprises a plurality of channels fluidly isolated from each other.

25. The system of claim 24, wherein the plurality of channels comprise at least one lower channel disposed between an outer surface of a lower section of the sidewall and the insulating layer and at least one upper channel disposed between an outer surface of an upper section of the sidewall and the insulating layer.

* * * * *